(12) United States Patent
Fukui et al.

(10) Patent No.: US 7,329,706 B2
(45) Date of Patent: Feb. 12, 2008

(54) HEAT-CONDUCTIVE SILICONE COMPOSITION

(75) Inventors: Hiroshi Fukui, Chiba Prefecture (JP); Manabu Sutoh, Chiba Prefecture (JP); Hiroji Enami, Chiba Prefecture (JP); Masayuki Onishi, Chiba Prefecture (JP); Tadashi Okawa, Chiba Prefecture (JP); Satoshi Onodera, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 110 days.

(21) Appl. No.: 10/476,998

(22) PCT Filed: May 14, 2002

(86) PCT No.: PCT/JP02/04642

§ 371 (c)(1),
(2), (4) Date: Aug. 16, 2004

(87) PCT Pub. No.: WO02/092693

PCT Pub. Date: Nov. 21, 2002

(65) Prior Publication Data

US 2004/0254275 A1 Dec. 16, 2004

(30) Foreign Application Priority Data

| May 14, 2001 | (JP) | ................ 2001-143109 |
| May 21, 2001 | (JP) | ................ 2001-151356 |
| Jul. 23, 2001 | (JP) | ................ 2001-221952 |

(51) Int. Cl.
*C08L 83/05* (2006.01)
(52) U.S. Cl. .............. 524/588; 528/24; 528/31; 528/32
(58) Field of Classification Search ........... 524/588; 528/24, 31, 32
See application file for complete search history.

(56) References Cited

U.S. PATENT DOCUMENTS

| 5,008,307 | A | * | 4/1991 | Inomata .................. 523/220 |
| 5,256,480 | A | * | 10/1993 | Inoue et al. ............. 428/331 |
| 5,488,254 | A | * | 1/1996 | Nishimura et al. ....... 257/707 |
| 6,040,362 | A | * | 3/2000 | Mine et al. .............. 523/212 |
| 6,111,003 | A | * | 8/2000 | Nakanishi et al. ........ 524/265 |
| 6,306,957 | B1 | * | 10/2001 | Nakano et al. ........... 524/700 |
| 6,380,301 | B1 | * | 4/2002 | Enami et al. ............. 524/588 |

FOREIGN PATENT DOCUMENTS

EP  1 101 798  *  5/2001

OTHER PUBLICATIONS

Freeman, Silicones, Published for the Plastics Institute (1962), pp. 27.*

* cited by examiner

*Primary Examiner*—Kuo-Liang Peng
(74) *Attorney, Agent, or Firm*—Howard & Howard Attorney, P.C.

(57) ABSTRACT

A heat-conductive silicone composition comprising at least (A) an organopolysiloxane, (B) a heat-conductive filler, and (C) a specific organosiloxane. The silicone composition is excellent in handleability, even when it contains a large amount of a heat-conductive filler for the purpose of attaining higher heat conductivity.

18 Claims, No Drawings

HEAT-CONDUCTIVE SILICONE COMPOSITION

The present invention relates to a thermally conductive silicone composition, and more specifically, to a thermally conductive silicone composition exhibiting excellent handleability despite containing a large quantity of thermally conductive fillers added to produce a silicone composition exhibiting high thermal conductivity.

BACKGROUND ART

In recent years, following an increase in the degree of density and integration of hybrid ICs and printed circuit boards that carry transistors, ICs, memory elements, and other electronic components, various thermally conductive silicone compositions have been used in order to achieve efficient heat release from such devices. Publicly known thermally conductive silicone compositions include thermally conductive silicone greases, thermally conductive silicone gel compositions, and thermally conductive silicone rubber compositions.

Examples of thermally conductive silicone compositions that have been proposed include, for instance, a thermally conductive silicone composition comprising a vinyl-containing organosiloxane, an organohydrogenpolysiloxane, a thermally conductive filler, an adhesion promoter selected from aminosilane, epoxysilane, or alkyl titanate, and a platinum catalyst (see Japanese Unexamined Patent Application Publication No. Sho 61-157569), a thermally conductive silicone composition comprising an organosiloxane containing an average of two alkenyl groups per molecule, an organosiloxane containing an average of three or more silicon-bonded hydrogen atoms per molecule, a thermally conductive filler made up of zinc oxide and magnesium oxide, a filler treating agent, and a platinum catalyst (see Japanese Unexamined Patent Application Publication No. Sho 62-184058), a thermally conductive silicone composition comprising an organosiloxane containing at least 0.1 mol % alkenyl groups per molecule, an organohydrogenpolysiloxane containing at least two silicon-bonded hydrogen atoms per molecule, a spherical alumina powder with an average particle size of 10 to 50 μm, a spherical or non-spherical alumina powder with an average particle size of less than 10 μm, and platinum or a platinum compound (see Japanese Unexamined Patent Application Publication No.63-251466), a thermally conductive silicone composition comprising an alkenyl-containing organosiloxane, an organohydrogenpolysiloxane, an irregular-shaped alumina powder with an average particle size of 0.1 to 5 μm, a spherical alumina powder with an average particle size of 5 to 50 μm, and a platinum catalyst (see Japanese Unexamined Patent Application Publication No. Hei 2-41362), a thermally conductive silicone composition comprising an organosiloxane containing at least two silicon-bonded alkenyl groups per molecule, an organohydrogenpolysiloxane containing at least three silicon-bonded hydrogen atoms per molecule, a thermally conductive filler with an average particle size of 5 to 20 μm, an adhesion promoter, and platinum or a platinum compound (see Japanese Unexamined Patent Application Publication No. Hei 2-97559).

To increase the thermal conductivity of such thermally conductive silicone compositions, the content of the thermally conductive fillers in the compositions has to be increased. This, however, brings about problems in terms of the handleability and moldability of the resultant silicone compositions.

In addition, other examples of thermally conductive silicone compositions that have been proposed include, for instance, a thermally conductive silicone composition comprising an organosiloxane containing at least two silicone-bonded alkenyl groups per molecule, an organohydrogenpolysiloxane containing at least two silicon-bonded hydrogen atoms per molecule, an organosiloxane containing at least one silicon-bonded alkoxy group or silicon-bonded hydroxyl group per molecule, a spherical or non-spherical alumina micropowder with an average particle size of less than 10 μm, a spherical or non-spherical alumina micropowder with an average particle size of 10 to 50 μm, and a hydrosilation reaction catalyst (Japanese Unexamined Patent Application Publication No. Hei 8-325457), a thermally conductive silicone composition comprising liquid silicone, at least one thickener selected from zinc oxide, alumina, aluminum nitride, boron nitride, or silicon carbide, an organosiloxane having at least one hydroxyl group directly bonded to a silicon atom per molecule, and an alkoxysilane (Japanese Unexamined Patent Application Publication No. Hei 11-49958).

However, in such thermally conductive silicone compositions, the organosiloxane containing at least one silicon-bonded hydroxyl group per molecule is substantially a diorganosiloxane having both terminal ends of its molecular chain blocked by silanol groups. When the amount of the thermally conductive fillers in the composition is increased in order to improve the thermal conductivity of the cured silicone product obtained by curing such a diorganosiloxane, the handleability and moldability of the resultant silicone composition deteriorates.

Furthermore, Japanese Unexamined Patent Application Publication No. 2000-256558 and Japanese Unexamined Patent Application Publication No. 2001-139815 have suggested using a dimethylpolysiloxane represented by the formula:

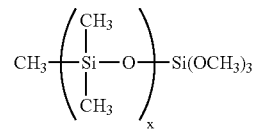

(where x is an integer of 5 to 100) in thermally conductive silicone compositions.

However, when such a thermally conductive silicone composition is loaded with high levels of alumina or a similar thermally conductive fillers in order to improve the thermal conductivity of the cured silicone product obtained by curing such a composition, the viscosity of the resultant composition rapidly increases and its handleability and moldability markedly deteriorate.

As a result of in-depth investigations into the above-described problems, the present inventors arrived at the present invention.

Namely, it is an object of the present invention to provide a thermally conductive silicone composition exhibiting excellent handleability despite containing a large quantity of thermally conductive fillers added to obtain a silicone composition exhibiting high thermal conductivity.

DISCLOSURE OF INVENTION

The thermally conductive silicone composition of the present invention is characterized by comprising:

(A) an organopolysiloxane,
(B) a thermally conductive filler, and
(C) at least one organosiloxane selected from the group consisting of
(i) an organosiloxane represented by the general formula:

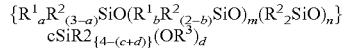

where $R^1$ is monovalent hydrocarbon groups having aliphatic unsaturated bonds, $R^2$ is identical or different monovalent hydrocarbon groups without aliphatic unsaturated bonds, $R^3$ is an alkyl, alkoxyalkyl, alkenyl, or acyl, the subscript a is an integer of 0 to 3, b is 1 or 2, c is an integer of 1 to 3, d is an integer of 1 to 3, c+d is an integer of 2 to 4, m is an integer of 0 or greater, and n is integer of 0 or greater, with the proviso that m is an integer of 1 or greater when a is 0,
(ii) an organosiloxane having one silicon-bonded hydroxyl group and at least five silicon atoms per molecule,
(iii) an organosiloxane represented by the general formula:

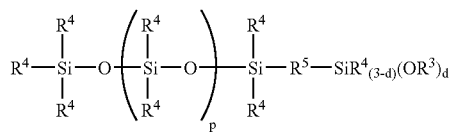

where $R^4$ is identical or different monovalent hydrocarbon groups, $R^5$ is an oxygen atom or divalent hydrocarbon group, $R^3$ is the same as defined above, p is an integer of 100 to 200, and d is the same as above, and
(iv) an organosiloxane represented by the general formula:

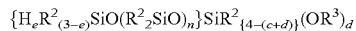

where $R^2$, $R^3$, c, d, and n are the same as defined above, and e is an integer of 1 to 3.

DETAILED DESCRIPTION OF THE INVENTION

The thermally conductive silicone composition of the present invention will be now explained in detail.

The present composition is characterized by comprising at least the above-mentioned Component (A), Component (B), and Component (C). In addition, the present composition can be rendered curable when it is further combined with (D) a curing agent. In such a case, there are no limitations concerning the cure mechanism of the present composition, which can be based, for instance, on a hydrosilation reaction, condensation reaction, or an organic peroxide-induced free radical reaction. The hydrosilation reaction is preferable because the composition cures faster and does not generate by-products.

The organopolysiloxane of Component (A) is the main component of the present composition. Methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and other linear alkyl groups; isopropyl, tertiary butyl, isobutyl, 2-methyl undecyl, 1-hexylheptyl, and other branched allkyl groups; cyclopentyl, cyclohexyl, cyclododecyl, and other cyclic alkyl groups; vinyl, allyl, butenyl, pentenyl, hexenyl, and other alkenyl groups; phenyl, tolyl, xylyl, and other aryl groups; benzyl, phenetyl, 2-(2,4,6-trimethylphenyl)propyl, and other aralkyl groups; 3,3,3-trifluoropropyl, 3-chloropropyl, and other halogenated alkyl groups are suggested as the silicon-bonded groups of the organopolysiloxane. Preferably, such groups are alkyl, alkenyl, or aryl groups, and especially preferably, methyl, vinyl, or phenyl. In addition, there are no limitations on the viscosity of the organopolysiloxane at 25° C. However, the viscosity is preferably within the range of from 20 to 100,000 mPa·s, more preferably, within the range of from 50 to 100,000 mPa·s, still more preferably, within the range of from 50 to 50,000 mPa·s, and especially preferably, within the range of from 100 to 50,000 mPa·s. This is due to the fact that when its viscosity at 25° C. is less than the lower limit of the above-mentioned range, the physical properties of the resultant silicone compositions tend to markedly decrease, and, on the other hand, when it exceeds the upper limit of the above-mentioned range, the handleability of the resultant silicone compositions tends to decrease. There are no limitations concerning the molecular structure of such an organopolysiloxane, which may be, for instance, linear, branched, partially branched linear, or dendritic (dendrimeric), and is preferably linear or partially branched linear. Examples of such organopolysiloxanes include, for instance, homopolymers possessing the above-mentioned molecular structures, copolymers having the above-mentioned molecular structures, or mixtures of the above-mentioned polymers.

Dimethylpolysiloxane having both terminal ends of its molecular chain blocked by dimethylvinylsiloxy groups, dimethylpolysiloxane having both terminal ends of its molecular chain blocked by methylphenylvinylsiloxy groups, dimethylsiloxane-methylphenyl siloxane copolymer having both terminal ends of its molecular chain blocked by dimethylvinylsiloxy groups, dimethylsiloxane-methylvinylsiloxane copolymer having both terminal ends of its molecular chain blocked by dimethylvinylsiloxy groups, dimethylsiloxane-methylvinylsiloxane copolymer having both terminal ends of its molecular chain blocked by trimethylsiloxy groups, methyl(3,3,3-trifluoropropyl)-polysiloxane having both terminal ends of its molecular chain blocked by dimethyl-vinylsiloxy groups, dimethylsiloxane-methylvinylsiloxane copolymer having both terminal ends of its molecular chain blocked by silanol groups, dimethylsiloxane-methylvinyl-siloxane-methylphenylsiloxane copolymer having both terminal ends of its molecular chain blocked by silanol groups, organosiloxane copolymer consisting of siloxane units represented by the formula $(CH_3)_3SiO_{1/2}$, siloxane units represented by the formula $(CH_3)_2(CH_2=CH)SiO_{1/2}$, siloxane units represented by the formula $CH_3SiO_{3/2}$, and siloxane units represented by the formula $(CH_3)_2SiO_{2/2}$, dimethylpolysiloxane having both terminal ends of its molecular chain blocked by silanol groups, dimethylsiloxane-methylphenyl siloxane copolymer having both terminal ends of its molecular chain blocked by silanol groups, dimethylpolysiloxane having both terminal ends of its molecular chain blocked by trimethoxysiloxy groups, dimethylsiloxane-methylphenylsiloxane copolymer having both terminal ends of its molecular chain blocked by trimethoxysilyl groups, dimethylpolysiloxane having both terminal ends of its molecular chain blocked by methyldimethoxysiloxy groups, dimethylpolysiloxane having both terminal ends of its molecular chain blocked by triethoxysiloxy groups, dimethylpolysiloxane having both terminal ends of its molecular chain blocked by trimethoxysilylethyl groups, and mixtures of two or more of the above-mentioned compounds are suggested as examples of such organopolysiloxanes.

In addition, when the present composition is cured by means of a hydrosilation reaction, Component (A) is preferably an organopolysiloxane having an average of not less than 0.1 silicon-bonded alkenyl groups per molecule. More preferably, it is an organopolysiloxane having an average of not less than 0.5 silicon-bonded alkenyl groups per molecule, and especially preferably, it is an organopolysiloxane having an average of not less than 0.8 silicon-bonded alkenyl groups per molecule. This is due to the fact that when the average number of silicon-bonded alkenyl groups per molecule is less than the lower limit of the above-mentioned range, the resultant compositions tend to fail to cure to a sufficient extent. The silicon-bonded alkenyl groups of the organopolysiloxane are exemplified by the same alkenyl groups as those mentioned above and are preferably represented by vinyl. In addition, silicon-bonded groups other than the alkenyl groups in the organopolysiloxane are exemplified by the same linear alkyl, branched alkyl, cyclic alkyl, aryl, aralkyl, halogenated alkyl groups as those mentioned above. They are preferably represented by alkyl and aryl groups, and especially preferably, by methyl and phenyl. In addition, although there are no limitations concerning the viscosity of the organopolysiloxane at 25° C., its viscosity is preferably within the range of from 20 to 100,000 mPa·s, more preferably, within the range of from 50 to 100,000 mPa·s, still more preferably, within the range of from 50 to 50,000 mPa·s, and especially preferably, within the range of from 100 to 50,000 mPa·s. This is due to the fact that when the viscosity of the composition at 25° C. is less than the lower limit of the above-mentioned range, the physical properties of the resultant cured silicone products tend to markedly deteriorate, and, on the other hand, when it exceeds the upper limit of the above-mentioned range, the handleability of the resultant silicone compositions tends to deteriorate. There are no limitations concerning the molecular structure of such organopolysiloxanes, which is exemplified by the same structures as those mentioned above, and is preferably linear or linear with partial branching. Such organopolysiloxanes are exemplified, for instance, by homopolymers having the above-mentioned molecular structures, copolymers having the above-mentioned molecular structures, or mixtures of these polymers. Such organopolysiloxanes are exemplified by organopolysiloxanes having the same alkenyl groups as those mentioned above.

In addition, when the present composition is cured by means of a condensation reaction, Component (A) is an organopolysiloxane having at least two silanol groups or silicon-bonded hydrolyzable groups per molecule. Examples of the silicon-bonded hydrolyzable groups in the organopolysiloxane include, for instance, methoxy, ethoxy, propoxy, and other alkoxy groups; vinyloxy, propenoxy, isopropenoxy, 1-ethyl-2-methylvinyloxy, and other alkenoxy groups; methoxyethoxy, ethoxyethoxy, methoxypropoxy, and other alkoxyalkoxy groups; acetoxy, octanoyloxy, and other acyloxy groups; dimethylketoxime, methylethylketoxime, and other ketoxime groups; dimethylamino, diethylamino, butylamino, and other amino groups; dimethylaminoxy, diethylaminoxy, and other aminoxy groups; N-methylacetamido groups, N-ethylacetamido, and other amido groups. In addition, the silanol groups and silicon-bonded hydrolyzable groups of the organopolysiloxane are exemplified by the same linear alkyl, branched alkyl, cyclic alkyl, alkenyl, aryl, aralkyl, and halogenated alkyl groups as those mentioned above. In addition, although there are no limitations concerning the viscosity of the organopolysiloxane at 25° C., its viscosity is preferably in the range of from 20 to 100,000 mPa·s, more preferably, in the range of from 50 to 100,000 mPa·s, and especially preferably, in the range of from 100 to 100,000 mPa·s. This is due to the fact that when its viscosity at 25° C. is less than the lower limit of the above-mentioned range, the physical properties of the resultant cured silicone products tend to undergo marked deterioration, and, on the other hand, when it exceeds the upper limit of the above-mentioned range, the handleability of the resultant silicone compositions tends to conspicuously deteriorate. There are no limitations concerning the molecular structure of such organopolysiloxanes, which is exemplified by the same structures as those mentioned above and is preferably linear or partially branched linear. Such organopolysiloxanes are exemplified by organopolysiloxanes having at least two silanol groups or silicon-bonded hydrolyzable groups per molecule, said groups being the same as those mentioned above.

In addition, when the present composition is cured by means of an organic peroxide-induced free radical reaction, there are no limitations concerning the organopolysiloxane of Component (A). However, it is preferably an organopolysiloxane having at least one silicon-bonded alkenyl group. Silicon-bonded groups in such an organopolysiloxane are exemplified by the same linear alkyl, branched alkyl, cyclic alkyl, alkenyl, aryl, aralkyl, and halogenated alkyl groups as those mentioned above and are preferably alkyl, alkenyl, or aryl groups, with methyl, vinyl, and phenyl being particularly preferable. In addition, although there are no limitations concerning the viscosity of the organopolysiloxane at 25° C., it is preferably in the range of from 20 to 100,000 mPa·s, more preferably, in the range of from 50 to 100,000 mPa·s, still more preferably, in the range of from 50 to 50,000 mPa·s, and especially preferably, in the range of from 100 to 50,000 mPa·s. This is due to the fact that when its viscosity at 25° C. is less than the lower limit of the above-mentioned range, the physical properties of the resultant cured silicone products tend to conspicuously deteriorate, and, on the other hand, when it exceeds the upper limit of the above-mentioned range, the handleability of the resultant silicone compositions is subject to conspicuous deterioration. There are no limitations concerning the molecular structure of such an organopolysiloxane, which is exemplified by the same structures as those mentioned above and is preferably linear or partially branched linear. Such organopolysiloxanes are exemplified, for instance, by homopolymers having the above-mentioned molecular structures, copolymers having the above-mentioned molecular structures, or mixtures of the above-mentioned polymers. Such organopolysiloxanes are exemplified by the same organopolysiloxanes as those mentioned above.

The thermally conductive filler of Component (B) is a component used to impart thermal conductivity to the resultant silicone composition and can be, for instance, aluminum powder, copper powder, nickel powder, or other metal powders; alumina powder, magnesia powder, beryllia powder, chromia powder, titania powder, or other metal oxide powders; boron nitride powder, aluminum nitride powder, or other metal nitride powders; born carbide powder, titanium carbide powder, silicon carbide powder, or other metal carbide powders; powders of Fe—Si alloys, Fe—Al alloys, Fe—Si—Al alloys, Fe—Si—Cr alloys, Fe—Ni alloys, Fe—Ni—Co alloys, Fe—Ni—Mo alloys, Fe—Co alloys, Fe—Si—Al—Cr alloys, Fe—Si—B alloys, Fe—Si—Co—B alloys; and other soft magnetic alloy powders; Mn—Zn ferrite, Mn—Mg—Zn ferrite, Mg—Cu—Zn ferrite, Ni—Zn ferrite, Ni—Cu—Zn ferrite, Cu—Zn ferrite, or other ferrites, and mixtures of two or more of the above-mentioned materials in addition, the shape of Component (B) can be, for instance, spherical, acicular, disk-like, rod-like, oblate, or irregular. When electrical insulation properties are required of the present composition, or the resultant cured silicone product obtained by curing the present composition, Component (B) is preferably a metal oxide powder, metal nitride powder, or metal carbide powder, especially preferably, an alumina powder. There are no limitations concerning the average particle size of Component (B), which is preferably in the range of from 0.1 to 100 µm, and especially preferably, in the range of from 0.1 to 50 µm. In addition, when alumina powder is used as the thermally conductive filler of Component (B), it is preferably a mixture of ($B_1$) a spherical alumina powder with an average particle size greater than 5 to 50 µm and ($B_2$) a spherical or irregular-shaped alumina powder with an average particle size of 0.1 to 5 µm. Furthermore, in such a mixture, the content of the above-mentioned component ($B_1$) is preferably in the range of from 30 to 90 wt % and the content of the above-mentioned component ($B_2$) is preferably in the range of from 10 to 70 wt %.

In the present composition, there are no limitations concerning the content of Component (B). However, in order to form a silicone composition of excellent thermal conductivity, its content in the present composition in vol % should preferably be at least 30 vol %, more preferably, in the range of from 30 to 90 vol %, still more preferably, in the range of from 60 to 90 vol %, and especially preferably, in the range of from 80 to 90 vol %. In the same manner, in order to form a silicone composition of excellent thermal conductivity, the content of Component (B) in wt % in the present composition should preferably be at least 50 wt %, more preferably, in the range of from 70 to 98 wt %, and especially preferably, in the range of from 90 to 97 wt %. Specifically, the content of Component (B) is preferably in the range of from 500 to 2,500 parts by weight, more preferably, in the range of from 500 to 2,000 parts by weight, and especially preferably, in the range of from 800 to 2,000 parts by weight per 100 parts by weight of Component (A). This is due to the fact that when the content of Component (B) is less than the lower limit of the above-mentioned range, the thermal conductivity of the resultant silicone compositions tends to be insufficient, and, on the other hand, when it exceeds the upper limit of the above-mentioned range, the viscosity of the resultant silicone compositions becomes too high and it becomes impossible to uniformly disperse Component (B) in the resultant silicone compositions and their handleability tends to conspicuously deteriorate.

Component (C) is a characteristic component used to obtain a thermally conductive silicone composition exhibiting excellent handleability despite containing a large quantity of the above-mentioned thermally conductive fillers of Component (B) used to produce a silicone composition exhibiting high thermal conductivity, and is at least one organosiloxane selected from the group consisting of (i) organosiloxane represented by the general formula:

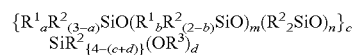

where $R^1$ stand for monovalent hydrocarbon groups having aliphatic unsaturated bonds, $R^2$ stand for identical or different monovalent hydrocarbon groups having no aliphatic unsaturated bonds, $R^3$ is an alkyl, alkoxyalkyl, alkenyl, or acyl, the subscript a is an integer of 0 to 3, b is 1 or 2, c is an integer of 1 to 3, d is an integer of 1 to 3, c+d is an interger of 2 to 4, m is an integer of 0 or greater, and n is integer of 0 or greater, with the proviso that m is an integer of 1 or greater when a is 0, (ii) an organosiloxane having one silicon-bonded hydroxyl group and at least five silicon atoms per molecule, (iii) an organosiloxane represented by the general formula:

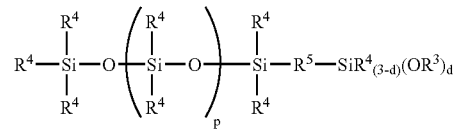

where $R^4$ stand for identical or different monovalent hydrocarbon groups, $R^5$ is an oxygen atom or divalent hydrocarbon group, $R^3$ is the same as defined above, p is an integer of 100 to 200, and d is the same as above, and (iv) an organosiloxane represented by the general formula:

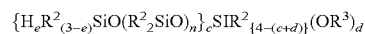

where $R^2$, $R^3$, c, d, and n are the same as defined above, and e is an integer of 1 to 3.

Component (i) is used to prevent the handleability and moldability of the present composition from deteriorating when a large quantity of the thermally conductive fillers of Component (B) are added in order to obtain a silicone composition exhibiting high thermal conductivity as well as to impart it with excellent adhesive properties with respect to the substrates the present composition comes in contact with in the process of curing if it is curable, and is represented by the general formula:

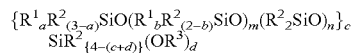

In the formula above, $R^1$ is monovalent hydrocarbon groups having aliphatic unsaturated bonds, for instance, vinyl, allyl, butenyl, hexenyl, decenyl, undecenyl, dodecenyl, tridecenyl, tetradecyl, pentadecenyl, hexadecyl, heptadecenyl, octadecenyl, nonadecenyl, eicosenyl, and other linear alkenyl groups; isopropenyl, 2-methyl-2-propenyl, 2-methyl-10-undecenyl, and other branched alkenyl groups; vinylcyclohexyl, vinylcyclododecyl, and other cyclic alkyl groups having aliphatic unsaturated bonds; vinylphenyl, and other aryl groups having aliphatic unsaturated bonds; vinylbenzyl, vinylphenetyl, and other aralkyl groups having aliphatic unsaturated bond. Preferably, these groups are linear alkenyl groups, and especially preferably, vinyl, allyl, or hexenyl. There are no limitations concerning the position of the aliphatic unsaturated bonds in $R^1$, but it is preferably a position located far from the attached silicon atoms. In addition, $R^2$ in the formula above stand for identical or different monovalent hydrocarbon groups that have no aliphatic unsaturated bonds, exemplified by the same linear alkyl, branched alkyl, cyclic alkyl, aryl, aralkyl, and halogenated alkyl groups as those mentioned above, preferably, by alkyl or aryl groups, and even more preferably, by $C_1$ to 4 alkyl groups, and especially preferably, by methyl or ethyl. In addition, $R^3$ in the formula above stands for alkyl, alkoxyalkyl, alkenyl, or acyl groups. The alkyl groups of $R^3$ are exemplified, for instance, by the same linear alkyl, branched alkyl, and cyclic alkyl groups as those mentioned above, preferably, by linear alkyl groups, and especially preferably, by methyl, ethyl, or propyl. In addition, the groups suggested as the alkoxy groups of $R^3$ are, for instance, methoxyethoxy, ethoxyethoxy, or methoxypropoxy, with methoxyethoxy being preferable. In addition, the alkenyl groups of $R^3$, are exemplified by the same alkenyl groups as those shown above, preferably by isopropenyl. In addition, the acyl groups of $R^3$ include, for instance, the acetoxy group. In addition, the subscript <<a>> in the formula above is an integer of 0 to 3, preferably 1. In addition, subscript b in the formula above is 1 or 2, preferably 1. In addition, the subscript c in the formula above is an integer of 1 to 3, preferably 1. In addition, the subscript d in the formula above is an integer of 1 to 3, preferably 3. The sum c+d in the formula above is an integer of 2 to 4. In addition, m in the formula above is an integer of 0 or greater. However, when the above-mentioned subscript a is 0, m is an integer of 1 or greater. The subscript m is preferably an integer of 0 to 100, more preferably, an integer of 1 to 100, still more preferably, an integer of 1 to 50, even more preferably, an integer of 1 to 25, and especially preferably, an integer of 1 to 10. In addition, the subscript <<n>> in the formula above is an integer of 0 or greater. The subscript n is preferably an integer of 0 to 100, more preferably, an integer of 1 to 100, still more preferably, an integer of 5 to 100, even more preferably, an integer of 10 to 100, and especially preferably, an integer of 10 to 75.

As for the methods used to prepare the organosiloxane of Component (i), for instance, a method can be suggested, in which an organosiloxane blocked by a silanol group at one of the ends of its molecular chain, represented by the general formula:

$$\{R^1{}_aR^2{}_{(3-a)}SiO(R^1{}_bR^2{}_{(2-b)}SiO)_m(R^2{}_2SiO)_n\}H,$$

and a silane compound represented by the general formula:

$$R^2{}_{(4-f)}Si(OR^3)_f$$

are reacted in the presence of acetic acid or another acid catalyst. In the above-mentioned silanol-capped organosiloxane, the $R^1$ and $R^2$ in the formula are the same groups as those mentioned above. In addition, the subscripts a, b, m, and n are the same integers as those mentioned above. On the other hand, in the above-mentioned silane compound, $R^2$ and $R^3$ in the formula are the same groups as those mentioned above. In addition, the subscript <<f>> in the formula is an integer of 2 to 4, preferably 4. Examples of such silane compounds include, for instance, dimethoxydimethylsilane, dimethoxydiethylsilane, diethoxydimethylsilane, diethoxydiethylsilane, and other dialkoxydialkylsilanes; trimethoxymethylsilane, trimethoxyethylsilane, trimethoxypropylsilane, triethoxymethylsilane, triethoxyethylsilane, and other trialkoxyalkylsilanes; tetramethoxysilane, tetraethoxysilane, tetrapropoxysilane, and other tetraalkoxysilanes; methyltri(methoxyethoxy)silane, and other alkoxyalkoxysilanes; methyltriisopropenoxy-silane, and other alkenoxysilanes; methyltriacetoxysilane, and other acyloxysilanes. In addition, examples of the acid catalysts include, for instance, acetic acid, propionic acid, and other fatty acids.

The organosiloxanes of Component (i) are exemplified by the following compounds.

$(CH_2=CH)(CH_3)_2SiO\{(CH_3)_2SiO\}_5Si(OCH_3)_3$
$(CH_2=CHCH_2)(CH_3)_2SiO\{(CH_3)_2SiO\}_5Si(OCH_3)_3$
$(CH_2=CHCH_2CH_2CH_2CH_2)(CH_3)_2SiO\{(CH_3)_2SiO\}_5Si(OCH_3)_3$
$(CH_2=CH)(CH_3)_2SiO\{(CH_3)_2SiO\}_7Si(OCH_3)_3$
$(CH_2=CH)(CH_3)_2SiO\{(CH_3)_2SiO\}_7Si(OC_2H_5)_3$
$(CH_2=CHCH_2)(CH_3)_2SiO\{(CH_3)_2SiO\}_7Si(OCH_3)_3$
$(CH_2=CHCH_2CH_2CH_2CH_2)(CH_3)_2SiO\{(CH_3)_2SiO\}_7Si(OCH_3)_3$
$(CH_2=CH)(CH_3)_2SiO\{(CH_3)_2SiO\}_7SiCH_3(OCH_3)_2$
$(CH_2=CH)(CH_3)_2SiO\{(CH_3)_2SiO\}_7SiCH_3(OCH_3)_2$
$(CH_2=CH)(CH_3)_2SiO\{(CH_3)_2SiO\}_{25}Si(OCH_3)_3$
$(CH_2=CHCH_2)(CH_3)_2SiO\{(CH_3)_2SiO\}_{25}Si(OCH_3)_3$
$(CH_2=CHCH_2CH_2CH_2CH_2)(CH_3)_2SiO\{(CH_3)_2SiO\}_{25}Si(OCH_3)_3$
$(CH_2=CH)(CH_3)_2SiO\{(CH_3)_2SiO\}_{25}Si(OC_2H_5)_3$
$(CH_2=CH)(CH_3)_2SiO\{(CH_3)_2SiO\}_{25}SiCH_3(OCH_3)_2$
$(CH_2=CH)(CH_3)_2SiO\{(CH_3)_2SiO\}_{50}Si(OCH_3)_3$
$(CH_2=CHCH_2)(CH_3)_2SiO\{(CH_3)_2SiO\}_{50}Si(OCH_3)_3$
$(CH_2=CHCH_2CH_2CH_2CH_2)(CH_3)_2SiO\{(CH_3)_2SiO\}_{50}Si(OCH_3)_3$
$(CH_2=CH)(CH_3)_2SiO\{(CH_3)_2SiO\}_{50}Si(OC_2H_5)_3$
$(CH_2=CH)(CH_3)_2SiO\{(CH_3)_2SiO\}_{50}SiCH_3(OCH_3)_2$
$\{(CH_3)_3SiO\{(CH_2=CH)(CH_3)SiO\}_1\{(CH_3)_2SiO\}_4\}Si(OCH_3)_3$
$\{(CH_3)_3SiO\{(CH_2=CH)_2SiO\}_1\{(CH_3)_2SiO\}_4\}Si(OCH_3)_3$
$\{(CH_3)_3SiO\{(CH_2=CH)(CH_3)SiO\}_1\{(CH_3)_2SiO\}_4\}Si(OC_2H_5)_3$
$\{(CH_2=CH)(CH_3)_2SiO\{(CH_2=CH)(CH_3)SiO\}_1\{(CH_3)_2SiO\}_4\}Si(OCH_3)_3$
$\{(CH_2=CH)(CH_3)_2SiO\{(CH_2=CH)_2SiO\}_1\{(CH_3)_2SiO\}_4\}Si(OCH_3)_3$
$\{(CH_2=CH)(CH_3)_2SiO\{(CH_2=CH)(CH_3)SiO\}_1\{(CH_3)_2SiO\}_4\}Si(OC_2H_5)_3$
$\{(CH_3)_3SiO\{(CH_2=CHCH_2)(CH_3)SiO\}_1\{(CH_3)_2SiO\}_4\}Si(OCH_3)_3$
$\{(CH_3)_3SiO\{(CH_2=CHCH_2)_2SiO\}_1\{(CH_3)_2SiO\}_4\}Si(OCH_3)_3$
$\{(CH_2=CHCH_2)(CH_3)_2SiO\{(CH_2=CH)(CH_3)SiO\}_1\{(CH_3)_2SiO\}_4\}Si(OHC_3)_3$
$\{(CH_2=CHCH_2)(CH_3)_2SiO\{(CH_2=CHCH_2)(CH_3)SiO\}_1\{(CH_3)_2SiO\}_4\}Si(OCH_3)_3$
$\{(CH_3)_3SiO\{(CH_2=CHCH_2CH_2CH_2CH_2)(CH_3)SiO\}_1\{(CH_3)_2SiO\}_4\}Si(OCH_3)_3$
$(CH_2=CHCH_2CH_2CH_2CH_2)(CH_3)_2SiO\{(CH_2=CH)(CH_3)SiO\}_1\{(CH_3)_2SiO\}_4\}Si(OCH_3)_3$
$(CH_2=CHCH_2CH_2CH_2CH_2)(CH_3)_2SiO\{(CH_2=CHCH_2CH_2CH_2CH_2)(CH_3)SiO\}_1\{(CH_3)_2SiO\}_4\}Si(OCH_3)_3$
$\{(CH_3)_3SiO\{(CH_2=CH)(CH_3)SiO\}_2\{(CH_3)_2SiO\}_{10}\}Si(OCH_3)_3$
$\{(CH_3)_3SiO\{(CH_2=CH)_2SiO\}_2\{(CH_3)_2SiO\}_{10}\}Si(OCH_3)_3$
$\{(CH_3)_3SiO\{(CH_2=CH)(CH_3)SiO\}_2\{(CH_3)_2SiO\}_{10}\}Si(OC_2H_5)_3$
$(CH_2=CH)(CH_3)_2SiO\{(CH_2=CH)(CH_3)SiO\}_2\{(CH_3)_2SiO\}_{10}\}Si(OCH_3)_3$
$(CH_2=CH)(CH_3)_2SiO\{(CH_2=CH)_2SiO\}_2\{(CH_3)_2SiO\}_{10}\}Si(OCH_3)_3$
$(CH_2=CH)(CH_3)_2SiO\{(CH_2=CH)(CH_3)SiO\}_2\{(CH_3)_2SiO\}_{10}\}Si(OC_2H_5)_3$
$\{(CH_3)_3SiO\{(CH_2=CHCH_2)(CH_3)SiO\}_2\{(CH_3)_2SiO\}_{10}\}Si(OCH_3)_3$
$\{(CH_3)_3SiO\{(CH_2=CHCH_2)_2SiO\}_2\{(CH_3)_2SiO\}_{10}\}Si(OCH_3)_3$
$\{(CH_2=CHCH_2)(CH_3)_2SiO\{(CH_2=CH)(CH_3)SiO\}_2\{(CH_3)_2SiO\}_{10}\}Si(OCH_3)_3$
$\{(CH_2=CHCH_2)(CH_3)_2SiO\{(CH_2=CHCH_2)(CH_3)SiO\}_2\{(CH_3)_2SiO\}_{10}\}Si(OCH_3)_3$
$\{(CH_3)_3SiO\{(CH_2=CHCH_2CH_2CH_2CH_2)(CH_3)SiO\}_2\{(CH_3)_2SiO\}_{10}\}Si(OCH_3)_3$
$\{(CH_2=CHCH_2CH_2CH_2CH_2)(CH_3)_2SiO\{(CH_2=CH)(CH_3)SiO\}_2\{(CH_3)_2SiO\}_{10}\}Si(OCH_3)_3$

{(CH₂=CHCH₂CH₂CH₂)(CH₃)₂SiO
{(CH₂=CHCH₂CH₂CH₂)(CH₃)SiO}₂}(CH₃)₂
SiO}₁₀Si(OCH₃)₃
{(CH₃)₃SiO{(CH₂=CH)(CH₃)SiO}₃{(CH₃)₂SiO}₂₂}Si
(OCH₃)₃
{(CH₃)₃SiO{(CH₂=CH)₂SiO}₃{(CH₃)₂SiO}₂₂}Si(OCH₃)₃
{(CH₃)₃SiO{(CH₂=CH)(CH₃)SiO}₃{(CH₃)₂SiO}₂₂}Si
(OC₂H₅)₃
{(CH₂=CH)(CH₃)₂SiO{(CH₂=CH)(CH₃)SiO}₃{(CH₃)₂
SiO}₂₂}Si(OCH₃)₃
{(CH₂=CH)(CH₃)₂SiO{(CH₂=CH)₂SiO}₃{(CH₃)₂
SiO}₂₂}Si(OCH₃)₃
{(CH₂=CH)(CH₃)₂SiO{(CH₂=CH)(CH₃)SiO}₃{(CH₃)₂
SiO}₂₂}Si(OC₂H₅)₃
{(CH₃)₃SiO{(CH₂=CHCH₂)(CH₃)SiO}₃{(CH₃)₂
SiO}₂₂}Si(OCH₃)₃
{(CH₃)₃SiO{(CH₂=CHCH₂)₂SiO}₃{(CH₃)₂SiO}₂₂}Si
(OCH₃)₃
{(CH₂=CHCH₂)(CH₃)₂SiO{(CH₂=CH)(CH₃)SiO}₃
{(CH₃)₂SiO}₂₂}Si(OCH₃)₃
{(CH₂=CHCH₂)(CH₃)₂SiO{(CH₂=CHCH₂)(CH₃)SiO}₃
{(CH₃)₂SiO}₂₂}Si(OCH₃)₃
{(CH₃)₃SiO{(CH₂=CHCH₂CH₂CH₂)(CH₃)SiO}₃
{(CH₃)₂SiO}₂₂}Si(OCH₃)₃
{(CH₂=CHCH₂CH₂CH₂)(CH₃)₂SiO{(CH₂=CH)
(CH₃)SiO}₃{(CH₃)₂SiO}₂₂}Si(OCH₃)₃
{(CH₂=CHCH₂CH₂CH₂)(CH₃)₂SiO
{(CH₂=CHCH₂CH₂CH₂)(CH₃)SiO}₃{(CH₃)₂
SiO}₂₂}Si(OCH₃)₃
{(CH₃)₃SiO{(CH₂=CH)(CH₃)SiO}₄{(CH₃)₂SiO}₅₀}Si
(OCH₃)₃
{(CH₃)₃SiO{(CH₂=CH)₂SiO}₄{(CH₃)₂SiO}₅₀}Si(OCH₃)₃
{(CH₃)₃SiO{(CH₂=CH)(CH₃)SiO}₄{(CH₃)₂SiO}₅₀}Si
(OC₂H₅)₃
{(CH₂=CH)(CH₃)₂SiO{(CH₂=CH)(CH₃)SiO}₄{(CH₃)₂
SiO}₅₀}Si(OCH₃)₃
{(CH₂=CH)(CH₃)₂SiO{(CH₂=CH)₂SiO}₄{(CH₃)₂
SiO}₅₀}Si(OCH₃)₃
{(CH₂=CH)(CH₃)₂SiO{(CH₂=CH)(CH₃)SiO}₄{(CH₃)₂
SiO}₅₀}Si(OC₂H₅)₃
{(CH₃)₃SiO{(CH₂=CHCH₂)(CH₃)SiO}₄{(CH₃)₂
SiO}₅₀}Si(OCH₃)₃
{(CH₃)₃SiO{(CH₂=CHCH₂)₂SiO}₄{(CH₃)₂SiO}₅₀}Si
(OCH₃)₃
{(CH₂=CHCH₂)(CH₃)₂SiO{(CH₂=CH)(CH₃)SiO}₄
{(CH₃)₂SiO}₅₀}Si(OCH₃)₃
{(CH₂=CHCH₂)(CH₃)₂SiO{(CH₂=CHCH₂)(CH₃)SiO}₄
{(CH₃)₂SiO}₅₀}Si(OCH₃)₃
{(CH₃)₃SiO{(CH₂=CHCH₂CH₂CH₂)(CH₃)SiO}₄
{(CH₃)₂SiO}₅₀}Si(OCH₃)₃
{(CH₂=CHCH₂CH₂CH₂)(CH₃)₂SiO{(CH₂=CH)
(CH₃)SiO)}₄{(CH₃)₂SiO}₅₀}Si(OCH₃)₃
{(CH₂=CHCH₂CH₂CH₂)(CH₃)₂SiO{
(CH₂=CHCH₂CH₂CH₂)(CH₃)SiO}₄{(CH₃)₂
SiO}₅₀}Si(OCH₃)₃

Component (ii), which is an organosiloxane having one silicon-bonded hydroxyl group and at least five silicon atoms per molecule, imparts the present composition with characteristics allowing it to have excellent handleability despite containing a large quantity of the thermally conductive filler of Component (B), which is added in order to obtain a silicone composition exhibiting high thermal conductivity. It is belived that Component (ii) acts as a plasticizer or treating agent that treats the surface of the thermally conductive filler of component (B) via the silicon-bonded hydroxyl groups, thereby lowering the viscosity of the resultant composition and enabling addition of even higher amounts of the fillers.

In addition, Component (ii) needs to have only one silicon-bonded hydroxyl group per molecule. A number of 2 or more promotes bonding between the particles of Component (B), which renders the viscosity of the resultant composition excessively high and makes it impossible to achieve higher levels of loading. In addition, per molecule, Component (ii) needs to have at least five silicon atoms, preferably, at least 10 atoms, even more preferably, 10 to 500 atoms, and especially preferably, 50 to 200 atoms. This is due to the fact that organosiloxane in which the number of silicon atoms per molecule is less than the lower limit of the above-mentioned range have molecules of excessively small size, and it tends to be impossible to treat the surface of Component (B) to a sufficient extent, and, in addition, in organosiloxanes in which it exceeds the upper limit of the above-mentioned range, the molecular volume bound by the surface of Component (B) increases excessively and it becomes difficult to increase the level of loading of Component (B).

There are no limitations concerning the organosiloxane of Component (ii), examples of which include, for instance,

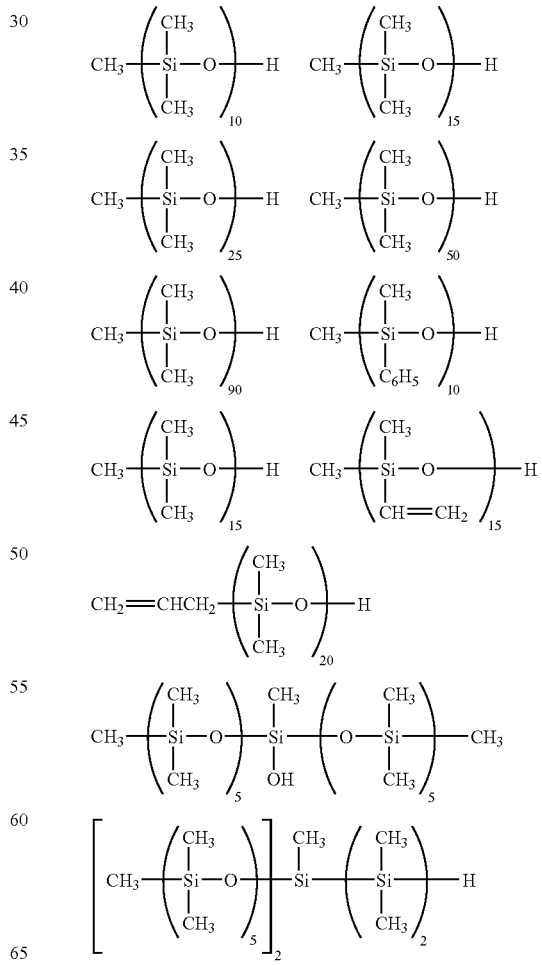

Component (ii) is preferably an organosiloxane represented by the general formula:

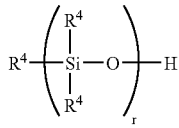

$R^4$ in the formula above are identical or different monovalent hydrocarbon groups exemplified by the same linear alkyl, branched alkyl, cyclic alkyl, aryl, aralkyl, alkenyl, and halogenated alkyl groups as those mentioned above. Preferably, these are alkyl groups, and especially preferably, methyl. In addition, the subscript <<r>> in the formula above is an integer of 5 or greater, preferably, an integer of 10 to 500, and especially preferably, an integer of 50 to 200.

In addition, the organosiloxane of Component (iii) is a component which is characterized by being capable of producing a thermally conductive silicone composition exhibiting excellent handleability even if it contains large quanitites of the above-described thermally conductive filler of Component (B), which is added in order to produce a silicone composition exhibiting high thermal conductivity. This is due to the fact that in the organosiloxane, which has a silicon-bonded hydrolyzable group at one of the ends of its molecular chain, diorganosiloxane repeat units are within a specified range. This organosiloxane is represented by the general formula:

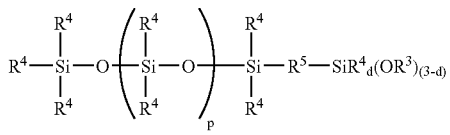

Where $R^4$ are identical or different monovalent hydrocarbon groups exemplified by the same linear alkyl, branched alkyl, cyclic alkyl, aryl, aralkyl, alkenyl, and halogenated alkyl groups as those mentioned above, preferably by linear alkyl groups, and especially preferably, by methyl. In addition, $R^5$ in the formula is an oxygen atom or a divalent hydrocarbon group. The divalent hydrocarbon groups of $R^5$ include, for instance, methylene, ethylene, propylene, isopropylene, butylene, and other alkylene groups; ethylenoxyethylene, ethylenoxypropylene, and other alkylenoxyalkylene groups. Particularly preferably, $R^5$ is an oxygen atom. In addition, $R^3$ in the formula above is represented by the same groups as those mentioned above. In addition, the subscript <<p>> is an integer of 100 to 200, preferably, an integer of 105 to 200, more preferably, an integer of 105 to 190, and especially preferably, an integer of 110 to 190. This is due to the fact that when the subscript <<p>> in the formula above is less than the lower limit of the above-mentioned range, addition of large quanitites of Component (B) in order to obtain a thermally conductive silicone composition tends to become imposssible, and, on the other hand, when it exceeds the upper limit of the above-mentioned range, the molecular volume bound by the surface of Component (B) increases excessively, and addition of a large quantity of Component (B) tends to become impossible. In particular, if the content of Component (B) in the present composition is made extremely high, such as 80 vol % or more, this trend becomes more conspicuous because the average distance between the particles of Component (B) become shorter. In addition, the subscript <<d>> is an integer of 1 to 3, preferably 3.

Examples of the organosiloxane of Component (iii) include, for instance,

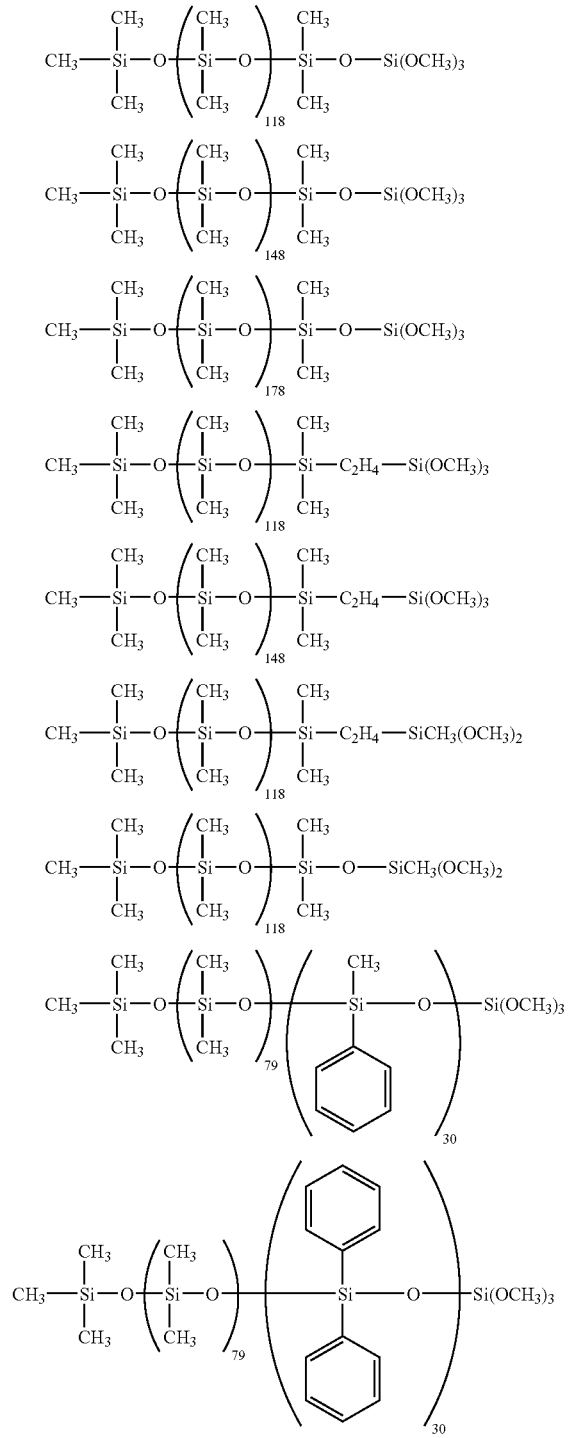

In addition, the organosiloxane of Component (iv) is used to prevent the handleability of the present composition from deteriorating when a large quantity of the thermally conductive fillers of Component (B) are added in order to obtain a silicone composition exhibiting high thermal conductivity as well as to impart it with superior moldability and excellent adhesive properties with respect to the substrates it comes in contact with in the process of curing if it is curable, and is represented by the general formula:

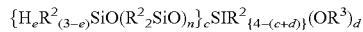

In the formula above, $R^2$ are identical or different monovalent hydrocarbon groups having no aliphatic unsaturated bonds and exemplified by the same groups as those mentioned above, preferably, by alkyl or aryl groups, more preferably, by $C_{1\ to\ 4}$ alkyl groups, and especially preferably, by methyl or ethyl. In addition, $R^3$ in the formula above stands for alkyl, alkoxyalkyl, alkenyl, or acyl groups exemplified by the same groups as those mentioned above, preferably alkyl groups, and especially preferably, by methyl, ethyl, or propyl. In addition, the subscript <<e>> is an integer of 1 to 3, preferably 1. In addition, the subscript <<c>> in the formula above is an integer of 1 to 3, preferably 1. In addition, the subscript <<d>> in the formula above is an integer of 1 to 3, preferably 3. Also, the sum <<c+d>> in the formula above is an integer of 2 to 4. In addition, the subscript <<n>> is an integer of 0 or greater, preferably, an integer of 0 to 100, more preferably, an integer of 1 to 100, even more preferably, an integer of 5 to 100, still more preferably, an integer of 10 to 100, and especially preferably, an integer of 10 to 75.

The methods used for the preparation of the organosiloxane of Component (iv) include, for instance, a process, in which an organosiloxane capped with a silanol group at one of the ends of its molecular chain, represented by the general formula:

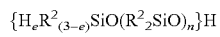

and a silane compound represented by the general formula:

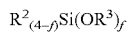

are reacted in the presence of acetic acid or another acid catalyst. In the above-mentioned silanol-capped organosiloxane, $R^2$ are identical or different monovalent hydrocarbon groups having no aliphatic unsaturated bonds and exemplified by the same groups as those mentioned above. In addition, the subscript <<e>> in the formula above is an integer of 1 to 3, preferably 1. In addition, the subscript n in the formula above is an integer of 0 or greater, preferably an integer of 0 to 100, more preferably, an integer of 1 to 100, still more preferably, an integer of 5 to 100, even more preferably, an integer of 10 to 100, and especially preferably, an integer of 10 to 75. On the other hand, in the above-mentioned silane compound, $R^2$ in the formula stand for identical or different monovalent hydrocarbon groups having no aliphatic unsaturated bonds and exemplified by the same groups as those mentioned above. In addition, $R^3$ in the formula above stands for alkyl, alkoxyalkyl, alkenyl, or acyl groups exemplified by the same groups as those mentioned above. In addition, the subscript <<f>> is an integer of 2 to 4, preferably 4. Suggested silane compounds include, for instance, dimethoxydimethylsilane, dimethoxydiethylsilane, diethoxydimethylsilane, diethoxydiethylsilane, and other dialkoxydialkylsilanes; trimethoxymethylsilane, trimethoxyethylsilane, trimethoxypropylsilane, triethoxymethylsilane, triethoxyethylsilane, and other trialkoxyalkylsilanes; tetramethoxysilane, tetraethoxysilane, tetrapropoxysilane, and other tetraalkoxysilanes; methyltri(methoxyethoxy)silane, and other alkoxyalkoxysilanes; methyltriisopropenoxysilane, and other alkenoxysilanes; methyltriacetoxysilane, and other acyloxysilanes. In addition, suggested acid catalysts include, for instance, acetic acid, propionic acid, and other fatty acids.

The organosiloxane of Component (iv) is exemplified by the following compounds.

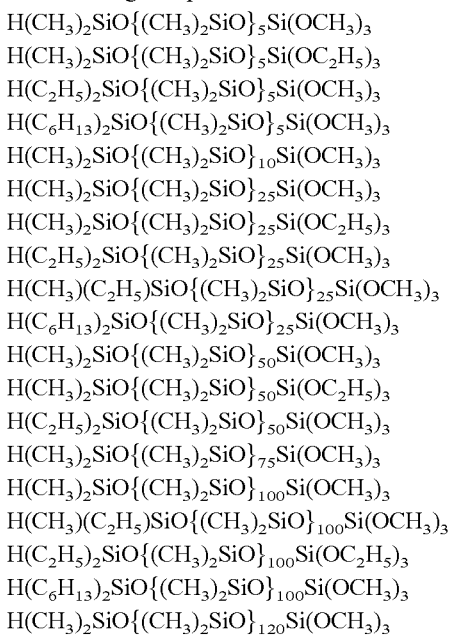

In the present composition, there are no limitations concerning the content of Component (C). The content should permit sufficient treatment of the surface of Component (B) to improve its dispersibility in the resultant thermally conductive silicone composition. Specifically, the content should be preferably in the range of from 0.1 to 10 parts by weight per 100 parts by weight of Component (B), and especially preferably, in the range of from 0.1 to 5 parts by weight per 100 parts by weight of Component (B). This is due to the fact that when the content of Component (C) is less than the lower limit of the above-mentioned range, adding a large quantity of Component (B) leads to a decrease in the moldability of the resultant silicone composition and Component (B) tends to precipitate and separate during the storage of the resultant silicone composition. On the other hand, when it exceeds the upper limit of the above-mentioned range, the physical properties of the resultant silicone composition tend to deteriorate.

In addition, in the present composition, any single component or a combination of two or more of the above-mentioned Component (i) through Component (iv) can be used as the above-mentioned Component (C). In addition, in order to obtain a thermally conductive silicone composition exhibiting excellent handleability even if it contains a large quantity of the thermally conductive filler of Component (B) added with a view to obtain a silicone composition exhibiting high thermal conductivity, a silane compound represented by the general formula:

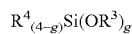

(where $R^4$ stands for a monovalent hydrocarbon group, $R^3$ stands for an alkyl, alkoxyalkyl, alkenyl, or acyl group, and the subscript <<g>> is an integer of 1 to 3), or an organosiloxane represented by the general formula:

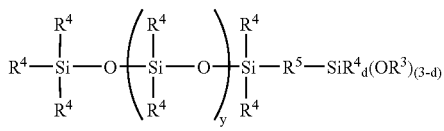

where $R^4$ stands for identical or different monovalent hydrocarbon groups, $R^5$ stands for an oxygen atom or divalent hydrocarbon group, $R^3$ stands for an alkyl, alkoxy alkyl, alkenyl, or acyl group, the subscript y is an integer of 0 to 99, and the subscript d is an integer of 1 to 3 can be used in combination with the above-mentioned Component (C).

In the silane compound, $R^4$ in the formula stands for a monovalent hydrocarbon group exemplified by the same groups as those mentioned above. In addition, $R^3$ in the formula stands for an alkyl, alkoxyalkyl, alkenyl, or acyl group exemplified by the same groups as those mentioned above. In addition, the subscript g in the formula is an integer of 1 to 3, preferably 2 or 3. Such silane compounds are exemplified by methyltrimethoxysilane, dimethyldimethoxysilane, ethyltrimethoxysilane, octyltrimethoxysilane, nonyltrimethoxysilane, decyltrimethoxysilane, vinyltrimethoxysilane, phenyltrimethoxysilane, methyltriethoxysilane, and other alkoxysilanes; methyltri(methoxyethoxy)silane, and other alkoxyalkoxysilane; methyltriisopropenoxysilane, and other alkenoxysilanes; methyltriacetoxysilane, and other acyloxysilanes.

In addition, in this organosiloxane, $R^4$ in the formula stand for identical or different monovalent hydrocarbon groups exemplified by the same groups as those mentioned above. In addition, $R^5$ in the formula stands for an oxygen atom or divalent hydrocarbon group exemplified by the same groups as those mentioned above. In addition, $R^3$ in the formula stands for an alkyl, alkoxyalkyl, alkenyl, or acyl group exemplified by the same groups as those mentioned above. In addition, the subscript y is an integer of 0 to 99, preferably, an integer of 0 to 80, and especially preferably, an integer of 0 to 60. In addition, the subscript d in the formula is an integer of 1 to 3, preferably 3. Such organosiloxanes are exemplified, for instance, by

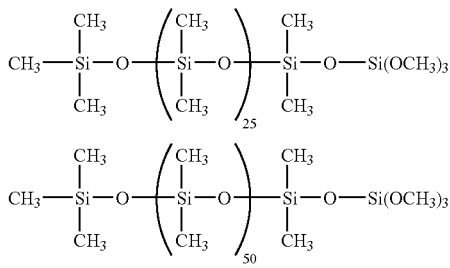

In the present composition, there are no limitations concerning the content of the above-mentioned silane compound or organosiloxane. The content should be sufficient to treat the surface of the above-described Component (B) with Component (C) so as to improve its dispersibility in the resultant thermally conductive silicone composition, specifically, it is preferably in the range of from 0.001 to 10 parts by weight per 100 parts by weight of Component (B), and especially preferably, in the range of from 0.001 to 5 parts by weight per 100 parts by weight of Component (B). This is due to the fact that when the content of the abovementioned silane compound or organosiloxane is less than the lower limit of the above-mentioned range, addition of large quanitities of Component (B) leads to a decrease in the moldability of the resultant silicone composition as well as to the precipitation and separation of Component (B) during storage of the resultant silicone composition and to a marked drop in its consistency. On the other hand, when it exceeds the upper limit of the above-mentioned range, the physical properties of the resultant silicone composition tend to conspicuously deteriorate.

The methods used to add Component (C), or Component (C) and the above-mentioned silane compound or organosiloxane to the present composition include, for instance, a method of addition, in which Component (B) and Component (C), and, if needed, the above-mentioned silane compound or organosiloxane as well, are mixed so as to treat the surface of Component (B) first, or a method of addition, in which Component (A) and Component (B) are mixed and then combined with Component (C), and, if needed, with the above-mentioned silane compound or organosiloxane so as to treat the surface of Comonent (B) in Component (A), with the latter method being particularly preferable. Thus, Component (C), or Component (C) and the above-mentioned silane compound or organosiloxane, may be introduced into the present composition in a state, in which the surface of Component (B) has been already treated, or introduced into the present composition separately. In addition, when Component (B) is treated with Component (C), or with Component (C) and the above-mentioned silane compound or organosiloxane, to accelerate the treatment, it can be conducted under heating or in combination with acidic substances such as acetic acid, phosphoric acid etc., or basic substances such as trialkylamine, quaternary ammonium salts, ammonia gas, ammonium carbonate, etc.

The present composition may be further combined with (D) a curing agent, which makes it possible to produce a curable composition. When the present composition is cured by means of a hydrosilation reaction, the curing agent of Component (D) is made up of a platinum catalyst and an organopolysiloxane having an average of at least 2 siliconbonded hydrogen atoms per molecule. The groups bonded to silicon atoms in the organopolysiloxane are exemplified by the same linear alkyl, branched alkyl, cyclic alkyl, aryl, aralkyl, and halogenated alkyl groups as those mentioned above, preferably, by alkyl or aryl groups, and especially preferably, by methyl or phenyl. In addition, although there are no limitations concerning the viscosity of the organopolysiloxane at 25° C., it is preferably in the range of from 1 to 100,000 mPa·s, and especially preferably, in the range of from 1 to 5,000 mPa·s. There are no limitations concerning the molecular structure of such organopolysiloxanes. For instance, the structure can be linear, branched, partially branched linear, cyclic, or dendritic (dendrimeric). Suggested organopolysiloxanes include, for instance, homopolymers having the above-mentioned molecular structures, copolymers having the above-mentioned molecular structures, or mixtures of such polymers.

Suggested organopolysiloxanes include, for instance, dimethylpolysiloxane having both terminal ends of its molecular chain blocked by dimethylhydrogensiloxy groups, dimethylsiloxane-methylhydrogensiloxane copolymer having both terminal ends of its molecular chain blocked by trimethylsiloxy groups, dimethylsiloxane-methylhydrogensiloxane copolymer having both terminal ends of its molecular chain blocked by dimethylhydrogensiloxy groups, organosiloxane copolymer consisting of siloxane units of the formula: $(CH_3)_3 SiO_{1/2}$, siloxane units of the formula: $(CH_3)_2 HSiO_{1/2}$, and siloxane units of the formula: $SiO_{4/2}$, and mixtures of two or more of the above-mentioned compounds.

In the present composition, the content of the organopolysiloxane is the content necessary to cure the present composition. Specifically, it is preferably sufficient to provide between 0.1 mol and 10 mol, more preferably, between 0.1 mol and 5 mol, and especially preferably, between 0.1 mol to 3.0 mol of silicon-bonded hydrogen atoms from the component per 1 mol of silicon-bonded alkenyl groups of Component (A). This is due to the fact that when the content of this component is less than the lower limit of the above-mentioned range, the resultant silicone composition tends to fail to completely cure, and, on the other hand, when it exceeds the upper limit of the above-mentioned range, the resultant cured silicone product is extremely hard and tends to develop numerous cracks on the surface.

In addition, the platinum catalyst is a catalyst used to promote the curing of the present composition. Suggested examples of such catalysts include, for instance, chloroplatinic acid, alcohol solutions of chloroplatinic acid, olefin complexes of platinum, alkenylsiloxane complexes of platinum, and carbonyl complexes of platinum.

In the present composition, the content of platinum catalyst is the content necessary for curing the present composition. Specifically, it is sufficient to provide, in weight units, preferably between 0.01 ppm and 1,000 ppm, and particularly preferably between 0.1 ppm and 500 ppm of platinum metal from the component relative to the amount of Component (A). This is due to the fact that when the content of the component is less than the lower limit of the above-mentioned range, the resultant silicone composition tends to fail to completely cure, and, on the other hand, adding an amount exceeding the upper limit of the above-mentioned range does not significantly improve the cure rate of the the resultant silicone composition.

In addition, when the present composition is cured by means of a condensation reaction, Component (D) is characterized by consisting of a silane having at least 3 silicon-bonded hydrolyzable groups per molecule or a partial hydrolyzate thereof, and, if needed, a condensation reaction catalyst. The silicon-bonded hydrolyzable groups in the silane are exemplified by the same alkoxy, alkoxyalkoxy, acyloxy, ketoxime, alkenyl, amino, aminoxy, and amido groups as those mentioned above. In addition to the above-mentioned hydrolyzable groups, examples of groups that can be bonded to the silicon atoms of the silane include, for instance, the same linear alkyl, branched alkyl, cyclic alkyl, alkenyl, aryl, aralkyl, and halogenated alkyl groups as those mentioned above. Suggested silanes or their partial hydrolyzates include, for instance, methyltriethoxysilane, vinyltriethoxysilane, vinyltriacetoxysilane, and ethyl orthosilicate.

In the present composition, the content of the silane or its partial hydrolyzate is the content necessary to cure the present composition. Specifically, it is preferably in the range of from 0.01 to 20 parts by weight, and especially preferably, in the range of from 0.1 to 10 parts by weight per 100 parts by weight of Component (A). This is due to the fact that when the content of the silane or its partial hydrolyzate is less than the lower limit of the above-mentioned range, the storage stability of the resultant composition deteriorates, and, in addition, its adhesive properties tende to decrease. On the other hand, when it exceeds the upper limit of the above-mentioned range, the cure of the resultant composition tends to conspicuously slow down.

In addition, the condensation reaction catalyst is an optional component which is not essential when using silanes having, for instance, aminoxy, amino, ketoxime, and other hydrolyzable groups as curing agents. Suggested condensation reaction catalysts include, for instance, tetrabutyl titanate, tetraisopropyl titanate, and other organic titanates; diisopropoxybis(acetylacetate)titanium, diisopropoxybis (ethylacetoacetate)titanium, and other chelate organotitanium compounds; aluminum tris(acetylacetonate), aluminum tris(ethylacetoacetate), and other oranic aluminum compounds; zirconium tetra(acetylacetonate), zirconium tetrabutyrate, and other oranic zirconium compounds; dibutyltin dioctoate, dibutyltin dilaurate, butyltin-2-ethylhexoate, and other organotin compounds; tin naphthenoate, tin oleate, tin butyrate, cobalt naphthenoate, zinc stearate, and other metal salts of organic carboxylic acids; hexylamine, dodecylamine phosphates and other amine compounds or their salts; benzyltriethylammonium acetate, and other quaternary ammonium salts; potassium acetate, lithium nitrate, and other lower fatty acid salts of alkali metals; dimethylhydroxylamine, diethylhydroxylamine, and other dialkylhydroxylamines; and guanidyl-containing organosilicon compounds.

In the present composition, the content of the condensation reaction catalyst is arbitrary, and should be sufficient to cure the present composition. Specifically, it is preferably in the range of from 0.01 to 20 parts by weight, and especially preferably, in the range of from 0.1 to 10 parts by weight per 100 parts by weight of Component (A). This is due to the fact that if the catalyst is essential, then a catalyst content smaller than the lower limit of the above-mentioned range tends to make it difficult for the resultant composition to cure completely, and, on the other hand, when the content exceeds the upper limit of the above-mentioned range, the storage stability of the resultant composition tends decrease.

In addition, when the present composition is cured by means of an organic peroxide-induced free radical reaction, Component (D) is an organic peroxide. Suggested organic peroxides include, for instance, benzoyl peroxide, dicumyl peroxide, 2,5-dimethyl-bis(2,5-t-butylperoxy)hexane, di-t-butyl peroxide, and t-butylperbenzoate.

The content of the organic peroxides is the content necessary to cure the present composition, specifically, it is preferably in the range of from 0.1 to 5 parts by weight per 100 parts by weight of the organopolysiloxane of the above-mentioned Component (A).

Furthermore, so long as the object of the present invention is not impaired, the present composition may contain other optional components, for instance, fumed silica, precipitated silica, fumed titania, and other fillers; fillers obtained by treating the surface of the above-mentioned fillers with organosilicon compounds to render it hydrophobic; 3-glycidoxypropyltrimethoxysilane, 3-methacryloxypropyltrimethoxysilane, and other adhesion promoters; and, additionally, pigments, dyes, fluorescent dyes, heat resistant agents, triazole compounds, and other flame retardants, and plasticizing agents.

In particular, when the present composition is cured by means of a hydrosilation reaction, to adjust the cure rate of the present composition and improve its handleability, it is preferable to combine it with 2-methyl-3-butyn-2-ol, 2-phenyl-3-butyn-2-ol, 1-ethynyl-1-cyclohexanol, and other acetylene compounds; 3-methyl-3-penten-1-yne, 3,5-dimethyl-3-hexen-1-yne, and other ene-yne compounds; and, in addition, hydrazine compounds, phosphine compounds, mercaptan compounds, and other cure reaction inhibitors. There are no limitations concerning the content of the cure reaction inhibitors, however, preferably it is in the range of from 0.0001 to 1.0 wt % relative to the amount of the present composition.

In case the present composition is curable, there are no limitations concering the method of curing. The method, for instance, may involve molding the present composition and then allowing it to stand at room temperature, or molding the present composition and then heating it to 50 to 200° C. In addition, there are no limitations concerning the physical characteristics of the thus obtained silicone, but suggested forms include, for instance, gels, low-hardness rubbers, or high-hardness rubbers.

EXAMPLES

The thermally conductive silicone composition of the present invention will be now explained by referring to Practical Examples. Additionally, it should be noted that the physical characteristics described in the Practical Example s are represented by values obtained at 25° C.

Practical Example 1

To 84.7 parts by weight of dimethylpolysiloxane with a viscosity of 400 mPa·s having both terminal ends of its molecular chain blocked by dimethylvinylsiloxy groups (vinyl group content=0.44 wt %) were added 900 parts by weight of spherical alumina powder with an average particle size of 10 µm, and 10 parts by weight of organosiloxane represented by the formula:

$(CH_2=CH)(CH_3)_2SiO\{(CH_3)_2SiO\}_{25}Si(OCH_3)_3$ and combined in a mixer. Next, 4.3 parts by weight of dimethylsiloxane-methylhydrogensiloxane copolymer having both terminal ends of its molecular chain blocked by trimethylsiloxy groups, a viscosity of 5 mPa·s and an average of five silicon-bonded hydrogen atoms per molecule (content of silicon-bonded hydrogen atoms=0.74 wt %) and 0.5 parts by weight of 1-ethynyl-1-cyclohexanol as a cure reaction inhibitor were combined with the mixture. Finally, a thermally conductive silicone rubber composition was prepared by combining the mixture with 0.5 parts by weight of a 1,3-divinyl-1,1,3,3-tetramethyldisiloxane complex of platinum with a platinum content of 0.5 wt %.

The characteristics of the thermally conductive silicone rubber composition and thermally conductive silicone rubber were determined as follows, with the results listed in Table 1.

Consistency Of Thermally Conductive Silicone Rubber Composition

The ¼ cone penetration consistency of the thermally conductive silicone rubber composition was measured in accordance with the method stipulated in JIS K 2220. A high consistency value was interpreted as evidence of the high plasticity and superior handleability of the thermally conductive silicone rubber composition.

Moldability Of Thermally Conductive Silicone Rubber Composition

A layer of the thermally conductive silicone rubber composition with a thickness of 2 mm was produced by sandwiching it between pieces of ethylene tetrafluoride resin film with a thickness of 0.2 mm, after which it was cured by heating at 150° C. for 15 minutes. After that, the ethylene tetrafluoride resin film was peeled off and visual examination was carried out to determine whether a silicone rubber sheet had been formed. When a uniform silicone rubber sheet was formed, the moldability of the composition was evaluated as "excellent" and designated as "○"; when a sheet was formed, but had locations of partially low strength, the moldability was evaluated as "somewhat good" and designated as "□"; and when a sheet could not be formed, or had low strength when formed, the moldability was evaluated as "no good" and designated as "x".

Thermal Conductivity Of Thermally Conductive Silicone Rubber

The thermal conductivity of the thermally conductive silicone rubber obtained by heating the thermally conductive silicone rubber composition at 150° C. for 15 minutes was determined in accordance with the hot wire method stipulated in JIS R 2616 using a Quick Thermal Conductivity Meter, the QTM-500, manufactured by Kyoto Electronics Manufacturing Co., Ltd.

Adhesive Strength Of Thermally Conductive Silicone Rubber

The thermally conductive silicone rubber composition was sandwiched between two pieces of identical material and then cured by heating at 150° C. for 30 minutes. Aluminum plates (JIS H 4000, A1050P), nickel plates (SPCC-SB), and stainless steel plates (SUS-304 2B) from Paltek Co., Ltd. were used as the adherend material. In addition, the surface area of the plates, to which the composition was adhered, was 25 mm×10 mm, and the thickness of the adhered layer was 1 mm. The tensile shear adhesive strength of the thermally conductive silicone rubber was measured in accordance with JIS K 6249.

Practical Example 2

Dimethylpolysiloxane (85.4 parts by weight) with a viscosity of 400 mPa·s having both terminal ends of its molecular chain blocked by dimethylvinylsiloxy groups (vinyl group content=0.44 wt %), 900 parts by weight of spherical alumina powder with an average particle size of 10 µm, and 10 parts by weight of organosiloxane represented by the formula:

$(CH_2=CH)(CH_3)_2SiO\{(CH_3)_2SiO\}_{50}Si(OCH_3)_3$ were combined in a mixer. Next, 3.6 parts by weight of dimethylsiloxane-methylhydrogensiloxane copolymer having both terminal ends of its molecular chain blocked by trimethylsiloxy groups, a viscosity of 5 mPa·s, and an average of five silicon-bonded hydrogen atoms per molecule (content of silicon-bonded hydrogen atoms=0.74 wt %) and 0.5 parts by weight of 1-ethynyl-1-cyclohexanol as a cure reaction inhibitor were combined with the mixture. Finally, a thermally conductive silicone rubber composition was prepared by combining the mixture with 0.5 parts by weight of a 1,3-divinyl-1,1,3,3-tetramethyldisiloxane complex of platinum with a platinum content of 0.5 wt %. The characteristics of the thermally conductive silicone rubber composition and thermally conductive silicone rubber were determined in the same manner as in Practical Example 1, and the results were listed in Table 1.

Practical Example 3

Dimethylpolysiloxane (83.7 parts by weight) with a viscosity of 400 mPa·s having both terminal ends of its molecular chain blocked by dimethylvinyisiloxy groups (vinyl group content=0.44 wt %), 900 parts by weight of spherical alumina powder with an average particle size of 10 μm, and 10 parts by weight of organosiloxane represented by the formula:

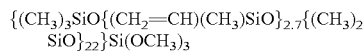

were combined in a mixer. Next, 5.3 parts by weight of dimethylsiloxane-methylhydrogensiloxane copolymer having both terminal ends of its molecular chain blocked by trimethylsiloxy groups, a viscosity of 5 mPa·s, and an average of five silicon-bonded hydrogen atoms per molecule (content of silicon-bonded hydrogen atoms=0.74 wt %) and 0.5 parts by weight of 1-ethynyl-1-cyclohexanol as a cure reaction inhibitor were combined with the mixture. Finally, a thermally conductive silicone rubber composition was prepared by combining the mixture with 0.5 parts by weight of a 1,3-divinyl-1,1,3,3-tetramethyldisiloxane complex of platinum with a platinum content of 0.5 wt %. The physical properties of the thermally conductive silicone rubber composition and thermally conductive silicone rubber were determined in the same manner as in Practical Example 1, and the results were listed in Table 1.

Practical Example 4

Dimethylpolysiloxane (42.4 parts by weight) with a viscosity of 400 mPa·s having both terminal ends of its molecular chain blocked by dimethylvinylsiloxy groups (vinyl group content=0.44 wt %), 552 parts by weight of spherical alumina powder with an average particle size of 40 μm, 368 parts by weight of irregular-shaped alumina powder with an average particle size of 2.2 μm, and 30 parts by weight of organosiloxane represented by the formula:

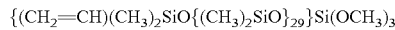

were combined in a mixer. Next, 4.6 parts by weight of dimethylsiloxane-methylhydrogensiloxane copolymer having both terminal ends of its molecular chain blocked by trimethylsiloxy groups, a viscosity of 5 mPa·s, and an average of five silicon-bonded hydrogen atoms per molecule (content of silicon-bonded hydrogen atoms=0.74 wt %), 0.5 parts by weight of 1-ethynyl-1-cyclohexanol as a cure reaction inhibitor, and 1.0 part by weight of 3-glycidoxypropyltrimethoxysilane and 1.0 part by weight of dimethylsiloxane-methylvinylsiloxane copolymer having both terminal ends of its molecular chain blocked by hydroxydimethyl groups and an average of two silicon-bonded vinyl groups per molecule (vinyl group content=9.6 wt %) as an adhesion promoter were combined with the mixture. Finally, a thermally conductive silicone rubber composition was prepared by combining the mixture with 0.5 parts by weight of a 1,3-divinyl-1,1,3,3-tetramethyldisiloxane complex of platinum with a platinum content of 0.5 wt %. The characteristics of the thermally conductive silicone rubber composition and thermally conductive silicone rubber were determined in the same manner as in Practical Example 1, and the results were listed in Table 1.

Comparative Example 1

Dimethylpolysiloxane (85.4 parts by weight) with a viscosity of 400 mPa·s having both terminal ends of its molecular chain blocked by dimethylvinylsiloxy groups (vinyl group content=0.44 wt %), 900 parts by weight of spherical alumina powder with an average particle size of 10 μm, and 10 parts by weight of methyltrimethoxysilane were combined in a mixer. Next, the mixture was combined with 3.6 parts by weight of dimethylsiloxane-methylhydrogensiloxane copolymer having both terminal ends of its molecular chain blocked by trimethylsiloxy groups, a viscosity of 5 mPa·s, and an average of five silicon-bonded hydrogen atoms per molecule (content of silicon-bonded hydrogen atoms=0.74 wt %) and 0.5 parts by weight of 1-ethynyl-1-cyclohexanol as a cure reaction inhibitor. Finally, a thermally conductive silicone rubber composition was prepared by combining the mixture with 0.5 parts by weight of a 1,3-divinyl-1,1,3,3-tetramethyldisiloxane complex of platinum with a platinum content of 0.5 wt %. The characteristics of the thermally conductive silicone rubber composition and thermally conductive silicone rubber were determined in the same manner as in Practical Example 1, and the results were listed in Table 1.

Comparative Example 2

A thermally conductive silicone rubber composition was prepared in the same manner as in Comparative Example 1 except for using an identical amount of decyltrimethoxysilane instead of the methyltrimethoxysilane used in Comparative Example 1. The characteristics of the thermally conductive silicone rubber composition and thermally conductive silicone rubber were determined in the same manner as in Practical Example 1 and the results were listed in Table 1.

Comparative Example 3

A thermally conductive silicone rubber composition was prepared in the same manner as in Comparative Example 1 except for using an identical amount of organosiloxane represented by the formula:

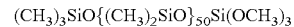

instead of the methyltrimethoxysilane used in Comparative Example 1. The characteristics of the thermally conductive silicone rubber composition and thermally conductive silicone rubber were determined in the same manner as in Practical Example 1 and the results were listed in Table 1.

TABLE 1

| | Examples | | | | | | |
| | Practical Examples | | | | Comparative Examples | | |
| Parameters | 1 | 2 | 3 | 4 | 1 | 2 | 3 |
| --- | --- | --- | --- | --- | --- | --- | --- |
| Consistency (mm/10) | 120 | 110 | 112 | 110 | 30 | 119 | 114 |
| Moldability | ◯ | ◯ | ◯ | ◯ | X | X | Δ |
| Thermoconductivity (W/mK) | 3.0 | 3.0 | 3.0 | 4.3 | 3.0 | 3.0 | 3.0 |
| Adhesive strength (N/cm²) | | | | | | | |
| Aluminum plates | 372 | 275 | 349 | 301 | 212 | 54 | 13 |
| Nickel plates | 293 | 262 | 295 | — | 193 | 60 | 22 |
| Stainless steel plates | 215 | 141 | 286 | — | 158 | 61 | 6.8 |

Practical Example 5

Dimethylpolysiloxane (100 parts by weight) with a viscosity of 400 mPa·s having the ends of its molecular chain blocked by dimethylvinylsiloxy groups (vinyl group content=0.44 wt %), 1200 parts by weight of a true spherical alumina powder with an average particle size of 10 μm, 800 parts by weight of an irregular-shaped alumina powder with an average particle size of 2.2 μm, and 20 parts by weight of dimethylsiloxane having one of the terminal ends of its molecular chain blocked by a silanol group, represented by the formula:

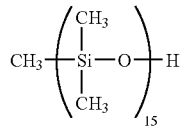

were mixed at room temperature for 30 minutes in a Ross mixer. Next, a thermally conductive silicone rubber base was prepared by mixing 4.4 parts by weight of dimethylpolysiloxane (content of silicon-bonded hydrogen atoms=0.12 wt %) with a viscosity of 10 mPa·s having both terminal ends of its molecular chain blocked by dimethylhydrogensiloxy groups, 0.5 parts by weight of dimethylsiloxane-methylhydrogensiloxane copolymer with a viscosity of 5 mPa·s having both terminal ends of its molecular chain blocked by trimethylsiloxy groups (content of silicon-bonded hydrogen atoms=0.64 wt %), and 0.02 parts by weight of 2-phenyl-3-butyn-2-ol as a cure reaction inhibitor with the resultant mixture at room temperature for 15 minutes.

Some of the silicone rubber base was placed in a 50-ml glass beaker and the ¼ cone penetration consistency of the silicone rubber base was measured in accordance with the method stipulated in JIS K 2220, with the results listed in Table 2. A high consistency value was interpreted as evidence of the high plasticity and superior handleability of the thermally conductive silicone rubber composition.

Next, a thermally conductive silicone rubber composition was prepared by uniformly mixing the silicone rubber base with 0.2 parts by weight of a 1,3-divinyl-1,1,3,3-tetramethyldisiloxane complex of platinum with a platinum content of 0.5 wt %.

The characteristics of the thermally conductive silicone rubber composition and thermally conductive silicone rubber were measured as follows, with the results listed in Table 2.

Moldability Of Thermally Conductive Silicone Rubber Composition

A layer of the thermally conductive silicone rubber composition with a thickness of 1 mm was produced by sandwiching it betweeen pieces of polyethylene terephthalate resin film (PET film) with a thicknesss of 50 μm, after which it was cured by heating at 100° C. for 30 minutes. After that, the PET resin film was peeled off and visual examination was carried out to determine whether a silicone rubber sheet had been formed. When a uniform silicone rubber sheet was formed, the moldability of the composition was evaluated as "excellent" and designated as "○"; when a sheet was formed, but had locations of partially low strength, the moldability was evaluated as "somewhat inferior" and designated as "□"; and when a sheet could not be formed, or had low strength when formed, the moldability was evaluated as "no good" and designated as "x".

Thermal Conductivity Of Thermally Conductive Silicone Rubber

The thermal conductivity of the thermally conductive silicone rubber obtained by heating the thermally conductive silicone rubber composition at 100° C. for 30 minutes was determined in accordance with the hot wire method stipulated in JIS R 2616 using a Quick Thermal Conductivity Meter, the QTM-500, manufactured by Kyoto Electronics Manufacturing Co., Ltd.

Hardness Of Thermally Conductive Silicone Rubber

The hardness of the thermally conductive silicone rubber obtained by heating the thermally conductive silicone rubber composition at 100° C. for 30 minutes was determined using a Type E durometer as stipulated in JIS K 6253.

Practical Example 6

A thermally conductive silicone rubber base was prepared in the same manner as in Practical Example 5 except for using an identical amount of dimethylsiloxane having one of the terminal ends of its molecular chain blocked by a silanol group, represented by the formula:

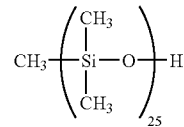

instead of the dimethylsiloxane having one of the terminal ends of its molecular chain blocked by a silanol group that was used in Practical Example 5. The consistency of the thermally conductive silicone rubber base was measured in the same manner as in Practical Example 5 and the results were listed in Table 2.

Next, a thermally conductive silicone rubber composition was prepared by uniformly mixing the silicone rubber base with 0.2 parts by weight of a 1,3-divinyl-1,1,3,3-tetramethyldisiloxane complex of platinum with a platinum content of 0.5 wt %. The characteristics of the thermally conductive silicone rubber composition and thermally conductive silicone rubber were measured in the same manner as in Practical Example 5 and the results were listed in Table 2.

Practical Example 7

A thermally conductive silicone rubber base was prepared in the same manner as in Practical Example 5 except for using an identical amount of dimethylsiloxane having one of the terminal ends of its molecular chain blocked by a silanol group, represented by the formula:

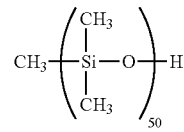

instead of the dimethylsiloxane having one of the terminal ends of its molecular chain blocked by a silanol group that was used in Practical Example 5. The consistency of the thermally conductive silicone rubber base was measured in the same manner as in Practical Example 5 and the results were listed in Table 2.

Next, a thermally conductive silicone rubber composition was prepared by uniformly mixing the silicone rubber base with 0.2 parts by weight of a 1,3-divinyl-1,1,3,3-tetramethyldisiloxane complex of platinum with a platinum content of 0.5 wt %. The characteristics of the thermally conductive silicone rubber composition and thermally conductive silicone rubber were measured in the same manner as in Practical Example 5 and the results were listed in Table 2.

Practical Example 8

A thermally conductive silicone rubber base was prepared in the same manner as in Practical Example 5 except for using an identical amount of dimethylsiloxane having one of the terminal ends of its molecular chain blocked by a silanol group, represented by the formula:

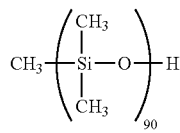

instead of the dimethylsiloxane having one of the terminal ends of its molecular chain blocked by a silanol group that was used in Practical Example 5. The consistency of the thermally conductive silicone rubber base was measured in the same manner as in Practical Example 5 and the results were listed in Table 2.

Next, a thermally conductive silicone rubber composition was prepared by uniformly mixing the silicone rubber base with 0.2 parts by weight of a 1,3-divinyl-1,1,3,3-tetramethyldisiloxane complex of platinum with a platinum content of 0.5 wt %. The characteristics of the thermally conductive silicone rubber composition and thermally conductive silicone rubber were measured in the same manner as in Practical Example 5 and the results were listed in Table 2.

Comparative Example 4

100 parts by weight of dimethylpolysiloxane with a viscosity of 400 mPa·s having both terminal ends of its molecular chain blocked by dimethylvinylsiloxy groups (vinyl group content=0.44 wt %), 1008 parts by weight of a true spherical alumina powder with an average particle size of 10 m, and 672 parts by weight of an irregular-shaped alumina powder with an average article size of 2.2 μm were mixed at room temperature for 30 minutes in a Ross mixer. Next, a thermally conductive silicone rubber base was prepared by mixing 4.4 parts by weight of dimethylpolysiloxane (content of silicon-bonded hydrogen atoms=0.12 wt %) with a viscosity of 10 mPa·s having both terminal ends of its molecular chain blocked by dimethylhydrogensiloxy groups, 0.5 parts by weight of dimethylsiloxane-methylhydrogensiloxane copolymer with a viscosity of 5 mPa·s having both terminal ends of its molecular chain blocked by trimethylsiloxy groups (content of silicon-bonded hydrogen atoms=0.64 wt %), and 0.02 parts by weight of 2-phenyl-3-butyn-2-ol as a cure reaction inhibitor with the resultant mixture at room temperature for 15 minutes. The consistency of the thermally conductive silicone rubber base was measured in the same manner as in Practical Example 5 and the results were listed in Table 2.

Next, a thermally conductive silicone rubber composition was prepared by uniformly mixing the silicone rubber base with 0.2 parts by weight of a 1,3-divinyl-1,1,3,3-tetramethyldisiloxane complex of platinum with a platinum content of 0.5 wt %. The characteristics of the thermally conductive silicone rubber composition and thermally conductive silicone rubber were measured in the same manner as in Practical Example 5 and the results were listed in Table 2. In comparison with Practical Examples 5 through 8, its consistency prior to cure was high, and its handleability was inferior. In addition to that, despite having the same crosslinking density, it was found to have a higher post-cure hardness, which resulted in a loss of elasticity.

Comparative Example 5

A thermally conductive silicone rubber base was prepared in the same manner as in Practical Example 5 except for using an identical amount of dimethylsiloxane having both terminal ends of its molecular chain blocked by silanol groups, represented by the formula:

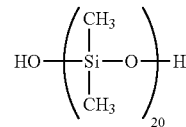

instead of the dimethylsiloxane having one of the terminal ends of its molecular chain blocked by a silanol group that was used in Practical Example 5. However, the viscosity of the composition increased excessively, which made it impossible to add all of the 1,200 parts by weight of the true spherical alumina powder with an average particle size of 10 μm and 800 parts by weight of the irregular-shaped alumina powder with an average particle size of 2.2 μm. As a result, the determination of the consistency of the thermally conductive silicone rubber base, the evaluation of the moldability of the thermally conductive silicone rubber composition, and the determination of the thermal conductivity and hardness of the thermally conductive silicone rubber could not be carried out.

Comparative Example 6

A thermally conductive silicone rubber base was prepared in the same manner as in Practical Example 5 except for reducing the amount of the true spherical alumina powder with an average particle size of 10 μm to 990 parts by weight and that of the irregular-shaped alumina powder with an average particle size of 2.2 μm to 660 parts by weight so as to bring their total content to 93 wt %. The consistency of the thermally conductive silicone rubber base was measured in the same manner as in Practical Example 5 and the results were listed in Table 2.

Next, a thermally conductive silicone rubber composition was prepared by uniformly mixing the silicone rubber base with 0.2 parts by weight of a 1,3-divinyl-1,1,3,3-tetramethyldisiloxane complex of platinum with a platinum content of 0.5 wt %. The characteristics of the thermally conductive silicone rubber composition and thermally conductive silicone rubber were measured in the same manner as in Practical Example 5 and the results were listed in Table 2. In comparison with Practical Examples 5 through 8, despite the fact that its thermal conductivity was lowered by reducing the loading levels of the true spherical alumina powder with an average particle size of 10 μm and that of the irregular-shaped alumina powder with an average particle size of 2.2 μm, it was found to exhibit a high consistency prior to cure and poor handleablity, and, in addtion to that, had a higher post-cure hardness, which resulted in a loss of elasticity.

Comparative Example 7

A thermally conductive silicone rubber base was prepared in the same manner as in Practical Example 5 except for using an identical amount of dimethylsiloxane having one of the terminal ends of its molecular chain blocked by a silanol group, represented by the formula:

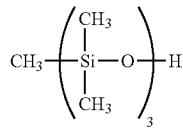

instead of the dimethylsiloxane having one of the terminal ends of its molecular chain blocked by a silanol group that was used in Practical Example 5. The consistency of the thermally conductive silicone rubber base was measured in the same manner as in Practical Example 5 and the results were listed in Table 2.

Next, a thermally conductive silicone rubber composition was prepared by uniformly mixing the silicone rubber base with 0.2 parts by weight of a 1,3-divinyl-1,1,3,3-tetramethyldisiloxane complex of platinum with a platinum content of 0.5 wt %. The characteristics of the thermally conductive silicone rubber composition and thermally conductive silicone rubber were measured in the same manner as in Practical Example 5 and the results were listed in Table 2. Although the dimethylsiloxane having one of the terminal ends of its molecular chain blocked by a silanol group that was used in this example was identical to the dimethylsiloxane having one of the terminal ends of its molecular chain blocked by a silanol group that was used in Practical Examples 5 through 8, because of the low degree of polymerization, efficient treatment was impossible and the resultant composition was found to exhibit a high consistency prior to cure and poor handleablity, and, in addition to that, had a higher post-cure hardness, which resulted in a loss of elasticity.

TABLE 2

| | Example | | | | | | |
|---|---|---|---|---|---|---|---|
| | Practical Examples | | | | Comparative Examples | | |
| Parameters | 5 | 6 | 7 | 8 | 4 | 6 | 7 |
| Consistency (mm/10) | 55 | 58 | 63 | 80 | 33 | 15 | 29 |
| Moldability | ○ | ○ | ○ | ○ | Δ | Δ | Δ |
| Thermal conductivity (W/m · k) | 4.8 | 4.6 | 4.6 | 4.6 | 4.7 | 4.0 | 4.5 |
| Hardness | 48 | 46 | 40 | 33 | 77 | 63 | 71 |

Practical Example 9

Dimethylpolysiloxane (100 parts by weight) with a viscosity of 400 mPa·s having both ends of its molecular chain blocked by dimethylvinylsiloxy groups (vinyl group content=0.44 wt %), 1200 parts by weight of a true spherical alumina powder with an average particle size of 10 μm, 800 parts by weight of an irregular-shaped alumina powder with an average particle size of 2.2 μm, and 20 parts by weight of dimethylsiloxane having one of the terminal ends of its molecular chain blocked by a trimethoxysiloxy group, represented by the formula:

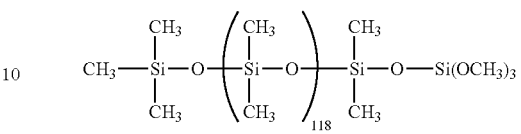

were mixed at room temperature for 30 minutes in a Ross mixer, after which a thermally conductive silicone rubber base was prepared by mixing 4.4 parts by weight of dimethylpolysiloxane (content of silicon-bonded hydrogen atoms=0.12 wt %) with a viscosity of 10 mPa·s having both terminal ends of its molecular chain blocked by dimethylhydrogensiloxy groups (an amount sufficient to provide 0.3 mol of silicon-bonded hydrogen atoms from the dimethylpolysiloxane per 1 mol of vinyl groups from the above-mentioned dimethylpolysiloxane having both ends of its molecular chain blocked by dimethylvinylsiloxy groups), 0.5 parts by weight of dimethylsiloxane-methylhydrogensiloxane copolymer (content of silicon-bonded hydrogen atoms=0.64 wt %) with a viscosity of 5 mPa·s having both terminal ends of its molecular chain blocked by trimethylsiloxy groups (an amount sufficient to provide 0.2 mol of silicon-bonded hydrogen atoms from the dimethylsiloxane-methylhydrogensiloxane copolymer per 1 mol of vinyl groups from the above-mentioned dimethylpolysiloxane having both ends of its molecular chain blocked by dimethylvinylsiloxy groups), and 0.02 parts by weight of 2-phenyl-3-butyn-2-ol as a cure reaction inhibitor (an amount sufficient to provide a concentration of 0.001 wt % in the present composition) with the resultant mixture at room temperature for 15 minutes.

Some of the silicone rubber base was placed in a 50-ml glass beaker and the ¼ cone penetration consistency of the silicone rubber base was measured in accordance with the method stipulated in JIS K 2220, with the results listed in Table 3. A high consistency value was interpreted as evidence of the high plasticity and superior handleability of the thermally conductive silicone rubber composition.

Next, a thermally conductive silicone rubber composition was prepared by uniformly mixing the silicone rubber base with 0.2 parts by weight of a 1,3-divinyl-1,1,3,3-tetramethyldisiloxane complex of platinum with a platinum content of 0.5 wt % (an amount sufficient to provide 10 ppm of platinum metal relative to the above-mentioned dimethylpolysiloxane having both terminal ends of its molecular chain blocked by dimethylvinylsiloxy groups). The content of alumina powder in the composition was 94.0 wt % (79.4 vol %). The characteristics of the thermally conductive silicone rubber composition and thermally conductive silicone rubber were measured as follows and the results were listed in Table 3.

Moldability Of Thermally Conductive Silicone Rubber Composition

A layer of the thermally conductive silicone rubber composition with a thickness of 1 mm was produced by sandwiching it betweeen pieces of polyethylene terephthalate resin film (PET film) with a thicknesss of 50 μm, after which it was cured by heating at 100° C. for 30 minutes. After that, the PET resin film was peeled off and visual examination was carried out to determine whether a silicone rubber sheet had been formed. When a uniform silicone rubber sheet was successfully formed, the moldability of the composition was evaluated as "excellent" and designated as "○"; when a sheet was formed, but exhibited partial cohesive failure, the moldability was evaluated as "somewhat inferior" and designated as "□"; and when a sheet could not be formed due to cohesive failure in a greater portion thereof, the moldability was evaluated as "no good" and designated as "x".

Thermal Conductivity Of Thermally Conductive Silicone Rubber

The thermal conductivity of the thermally conductive silicone rubber obtained by heating the thermally conductive silicone rubber composition at 100° C. for 30 minutes was determined in accordance with the hot wire method stipulated in JIS R 2616 using a Quick Thermal Conductivity Meter, the QTM-500, manufactured by Kyoto Electronics Manufacturing Co., Ltd.

Hardness Of Thermally Conductive Silicone Rubber

The hardness of the thermally conductive silicone rubber obtained by heating the thermally conductive silicone rubber composition at 100° C. for 30 minutes was determined using a Type E durometer as stipulated in JIS K 6253.

Practical Example 10

A thermally conductive silicone rubber base was prepared in the same manner as in Practical Example 9 except for using an identical amount of dimethylpolysiloxane having one of the terminal ends of its molecular chain blocked by a trimethoxysiloxy group, represented by the formula:

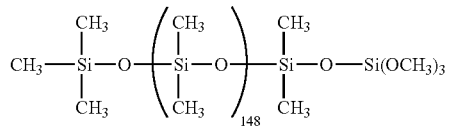

instead of the dimethylpolysiloxane having one of the terminal ends of its molecular chain blocked by a trimethoxysiloxy group that was used in Practical Example 9. The consistency of the silicone rubber base was measured in the same manner as in Practical Example 9 and the results were listed in Table 3.

Next, a thermally conductive silicone rubber composition was prepared by mixing the silicone rubber base with 0.2 parts by weight of a 1,3-divinyl-1,1,3,3-tetramethyldisiloxane complex of platinum with a platinum content of 0.5 wt % (an amount sufficient to provide 10 ppm of platinum metal relative to the above-mentioned dimethylpolysiloxane having both terminal ends of its molecular chain blocked by dimethylvinylsiloxy groups). The characteristics of the thermally conductive silicone rubber composition and thermally conductive silicone rubber were measured in the same manner as in Practical Example 9 and the results were listed in Table 3.

Practical Example 11

A thermally conductive silicone rubber base was prepared in the same manner as in Practical Example 9 except for using an identical amount of dimethylpolysiloxane having one of the terminal ends of its molecular chain blocked by a trimethoxysiloxy group, represented by the formula:

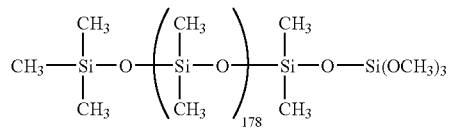

instead of the dimethylpolysiloxane having one of the terminal ends of its molecular chain blocked by a trimethoxysiloxy group that was used in Practical Example 9. The consistency of the silicone rubber base was measured in the same manner as in Practical Example 9 and the results were listed in Table 3.

Next, a thermally conductive silicone rubber composition was prepared by mixing the silicone rubber base with 0.2 parts by weight of a 1,3-divinyl-1,1,3,3-tetramethyldisiloxane complex of platinum with a platinum content of 0.5 wt % (an amount sufficient to provide 10 ppm of platinum metal relative to the above-mentioned dimethylpolysiloxane having both terminal ends of its molecular chain blocked by dimethylvinylsiloxy groups). The characteristics of the thermally conductive silicone rubber composition and thermally conductive silicone rubber were measured in the same manner as in Practical Example 9 and the results were listed in Table 3.

Comparative Example 8

A thermally conductive silicone rubber base was prepared in the same manner as in Practical Example 9 except for using an identical amount of dimethylpolysiloxane having one of the terminal ends of its molecular chain blocked by a trimethoxysiloxy group, represented by the formula:

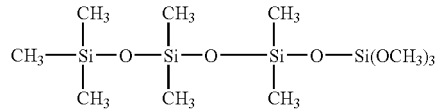

instead of the dimethylpolysiloxane having one of the terminal ends of its molecular chain blocked by a trimethoxysiloxy group that was used in Practical Example 9. The consistency of the silicone rubber base was measured in the same manner as in Practical Example 9 and the results were listed in Table 3.

Next, a thermally conductive silicone rubber composition was prepared by mixing the silicone rubber base with 0.2 parts by weight of a 1,3-divinyl-1,1,3,3-tetramethyldisiloxane complex of platinum with a platinum content of 0.5 wt % (an amount sufficient to provide 10 ppm of platinum metal relative to the above-mentioned dimethylpolysiloxane having both terminal ends of its molecular chain blocked by dimethylvinylsiloxy groups). The characteristics of the thermally conductive silicone rubber composition and thermally conductive silicone rubber were measured in the same manner as in Practical Example 9 and the results were listed in Table 3.

Comparative Example 9

A thermally conductive silicone rubber base was prepared in the same manner as in Practical Example 9 except for using an identical amount of dimethylpolysiloxane having one of the terminal ends of its molecular chain blocked by a trimethoxysiloxy group, represented by the formula:

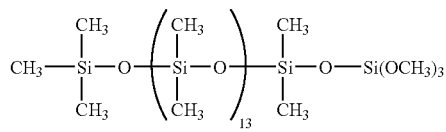

instead of the dimethylpolysiloxane having one of the terminal ends of its molecular chain blocked by a trimethoxysiloxy group that was used in Practical Example 9. The consistency of the silicone rubber base was measured in the same manner as in Practical Example 9 and the results were listed in Table 3.

Next, a thermally conductive silicone rubber composition was prepared by mixing the silicone rubber base with 0.2 parts by weight of a 1,3-divinyl-1,1,3,3-tetramethyldisiloxane complex of platinum with a platinum content of 0.5 wt % (an amount sufficient to provide 10 ppm of platinum metal relative to the above-mentioned dimethylpolysiloxane having both terminal ends of its molecular chain blocked by dimethylvinylsiloxy groups). The characteristics of the thermally conductive silicone rubber composition and thermally conductive silicone rubber were measured in the same manner as in Practical Example 9 and the results were listed in Table 3.

Comparative Example 10

A thermally conductive silicone rubber base was prepared in the same manner as in Practical Example 9 except for using an identical amount of dimethylpolysiloxane having one of the terminal ends of its molecular chain blocked by a trnethoxysiloxy group, represented by the formula:

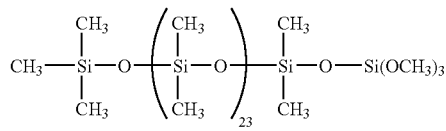

instead of the dimethylpolysiloxane having one of the terminal ends of its molecular chain blocked by a trimethoxysiloxy group that was used in Practical Example 9. The consistency of the silicone rubber base was measured in the same manner as in Practical Example 9 and the results were listed in Table 3.

Next, a thermally conductive silicone rubber composition was prepared by mixing the silicone rubber base with 0.2 parts by weight of a 1,3-divinyl-1,1,3,3-tetramethyldisiloxane complex of platinum with a platinum content of 0.5 wt % (an amount sufficient to provide 10 ppm of platinum metal relative to the above-mentioned dimethylpolysiloxane having both terminal ends of its molecular chain blocked by dimethylvinylsiloxy groups). The characteristics of the thermally conductive silicone rubber composition and thermally conductive silicone rubber were measured in the same manner as in Practical Example 9 and the results were listed in Table 3.

Comparative Example 11

A thermally conductive silicone rubber base was prepared in the same manner as in Practical Example 9 except for using an identical amount of dimethylpolysiloxane having one of the terminal ends of its molecular chain blocked by a trimethoxysiloxy group, represented by the formula:

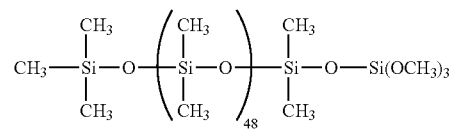

instead of the dimethylpolysiloxane having one of the terminal ends of its molecular chain blocked by a trimethoxysiloxy group that was used in Practical Example 9. The consistency of the silicone rubber base was measured in the same manner as in Practical Example 9 and the results were listed in Table 3.

Next, a thermally conductive silicone rubber composition was prepared by mixing the silicone rubber base with 0.2 parts by weight of a 1,3-divinyl-1,1,3,3-tetramethyldisiloxane complex of platinum with a platinum content of 0.5 wt % (an amount sufficient to provide 10 ppm of platinum metal relative to the above-mentioned dimethylpolysiloxane having both terminal ends of its molecular chain blocked by dimethylvinylsiloxy groups). The characteristics of the thermally conductive silicone rubber composition and thermally conductive silicone rubber were measured in the same manner as in Practical Example 9 and the results were listed in Table 3.

Comparative Example 12

An attempt was made to prepare a thermally conductive silicone rubber base in the same manner as in Practical Example 9 except for using an identical amount of dimethylpolysiloxane having both terminal ends of its molecular chain blocked by trimethoxysiloxy groups, represented by the formula:

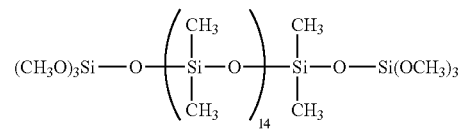

instead of the dimethylpolysiloxane having one of the terminal ends of its molecular chain blocked by a trimethoxysiloxy group that was used in Practical Example 9, but an excessive increase in the viscosity of the base made it impossible to add all of the 1,200 parts by weight of a true spherical alumina powder with an average particle size of 10 μm and the 800 parts by weight of an irregular-shaped alumina powder with an average particle size of 2.2 μm.

Comparative Example 13

A thermally conductive silicone rubber base was prepared in the same manner as in Practical Example 9 except for using an identical amount of dimethylpolysiloxane having both terminal ends of its molecular chain blocked by trimethoxysiloxy groups, represented by the formula:

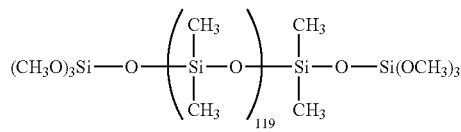

instead of the dimethylpolysiloxane having one of the terminal ends of its molecular chain blocked by a trimethoxysiloxy group that was used in Practical Example 9. The consistency of the silicone rubber base was measured in the same manner as in Practical, Example 9 and the results were listed in Table 3.

Next, a thermally conductive silicone rubber composition was prepared by mixing the silicone rubber base with 0.2 parts by weight of a 1,3-divinyl-1,1,3,3-tetramethyldisiloxane complex of platinum with a platinum content of 0.5 wt % (an amount sufficient to provide 10 ppm of platinum metal relative to the above-mentioned dimethylpolysiloxane having both terminal ends of its molecular chain blocked by dimethylvinylsiloxy groups). The characteristics of the thermally conductive silicone rubber composition and thermally conductive silicone rubber were measured in the same manner as in Practical Example 9 and the results were listed in Table 3.

TABLE 3

| Parameters | Examples | | | | | | | |
| --- | --- | --- | --- | --- | --- | --- | --- | --- |
| | Practical Examples | | | Comparative Examples | | | | |
| | 9 | 10 | 11 | 8 | 9 | 10 | 11 | 13 |
| Consistency (mm/10) | 95 | 94 | 92 | 38 | 58 | 65 | 75 | 28 |
| Moldability | ○ | ○ | ○ | Δ | ○ | ○ | ○ | Δ |
| Thermal conductivity (W/m · k) | 4.5 | 4.6 | 4.6 | 4.8 | 4.7 | 4.6 | 4.6 | 4.8 |
| Hardness | 22 | 24 | 26 | 72 | 50 | 40 | 37 | 84 |

In the thermally conductive silicone rubber compositions listed in Table 3, the content of alumina powder was 79.4 vol %. Comparison between Practical Examples 9 through 11 and Comparative Examples 8 through 11 showed that, depending on the number of dimethylsiloxane repeat units in the dimethylpolysiloxanes having one of the terminal ends of their molecular chains blocked by trimethoxysiloxy groups, there was considerable variation in the consistency of the thermally conductive silicone rubber compositions, and, in addition, considerable variation in the hardness of the silicone rubbers obtained by curing them. Additionally, comparison between Practical Example 9 and Comparative Example 13 showed that even if the number of dimethylsiloxane repeat units in the dimethylpolysiloxanes was the same, the consistency of the thermally conductive silicone rubber composition greatly varied and, in addition, there was considerable variation in the hardness of the silicone rubber produced by curing the compositions depending on whether the molecular chain was blocked with a trimethoxysiloxy group at one terminal end or with trimethoxysiloxy groups at both terminal ends. Furthermore, comparison between Comparative Example 12 and Comparative Example 13 showed that when both terminal ends of the molecular chain of the dimethylpolysiloxane were blocked by trimethoxysiloxy groups, the consistency of the thermally conductive silicone rubber composition increased and its handleability decreased regardless of the number of dimethylsiloxane repeat units.

Practical Example 12

Dimethylpolysiloxane (100 parts by weight) with a viscosity of 400 mPa·s having both ends of its molecular chain blocked by dimethylvinylsiloxy groups (vinyl group content=0.44 wt %), 1,500 parts by weight of a true spherical alumina powder with an average particle size of 10 μm, 1,000 parts by weight of an irregular-shaped alumina powder with an average particle size of 2.2 μm, and 26 parts by weight of dimethylsiloxane having one of the terminal ends of its molecular chain blocked by a trimethoxysiloxy group, represented by the formula:

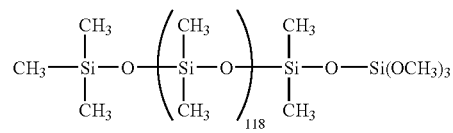

were mixed at room temperature for 30 minutes in a Ross mixer, after which a thermally conductive silicone rubber base was prepared by mixing 4.4 parts by weight of dimethylpolysiloxane (content of silicon-bonded hydrogen atoms=0.12 wt %) with a viscosity of 10 mPa·s having both terminal ends of its molecular chain blocked by dimethylhydrogensiloxy groups (an amount sufficient to provide 0.3 mol of silicon-bonded hydrogen atoms from the dimethylpolysiloxane per 1 mol of vinyl groups from the above-mentioned dimethylpolysiloxane having both ends of its molecular chain blocked by dimethylvinylsiloxy groups), 0.5 parts by weight of dimethylsiloxanemethylhydrogensiloxane copolymer (content of silicon-bonded hydrogen atoms=0.64 wt %) with a viscosity of 5 mPa·s having both terminal ends of its molecular chain blocked by trimethylsiloxy groups (an amount sufficient to provide 0.2 mol of silicon-bonded hydrogen atoms from the dimethylsiloxanemethylhydrogensiloxane copolymer per 1 mol of vinyl groups from the above-mentioned dimethylpolysiloxane having both ends of its molecular chain blocked by dimethylvinylsiloxy groups), and 0.02 parts by weight of 2-phenyl-3-butyn-2-ol as a cure reaction inhibitor (an amount sufficient to provide a concentration of 0.001 wt % in the present composition) with the resultant mixture at room temperature for 15 minutes. The consistency of the silicone rubber base was measured in the same manner as in Practical Exmaple 9 and the results were listed in Table 4.

Next, a thermally conductive silicone rubber composition was prepared by uniformly mixing the silicone rubber base with 0.2 parts by weight of a 1,3-divinyl-1,1,3,3-tetramethyldisiloxane complex of platinum with a platinum content of 0.5 wt % (an amount sufficient to provide 10 ppm of platinum metal relative to the above-mentioned dimethylpolysiloxane having both terminal ends of its molecular chain blocked by dimethylvinylsiloxy groups). The content of alumina powder in the composition was 95.0 wt % (82.4 vol %). The characteristics of the thermally conductive silicone rubber composition and thermally conductive silicone rubber were measured as follows and the results were listed in Table 4.

Practical Example 13

A thermally conductive silicone rubber base was prepared in the same manner as in Practical Example 12 except for using an identical amount of dimethylpolysiloxane having one of the terminal ends of its molecular chain blocked by a trimethoxysiloxy group, represented by the formula:

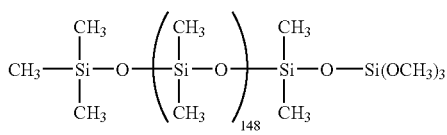

instead of the dimethylpolysiloxane having one of the terminal ends of its molecular chain blocked by a trimethoxysiloxy group that was used in Practical Example 12. The consistency of the silicone rubber base was measured in the same manner as in Practical Example 9 and the results were listed in Table 4.

Next, a thermally conductive silicone rubber composition was prepared by mixing the silicone rubber base with 0.2 parts by weight of a 1,3-divinyl-1,1,3,3-tetramethyldisiloxane complex of platinum with a platinum content of 0.5 wt % (an amount sufficient to provide 10 ppm of platinum metal relative to the above-mentioned dimethylpolysiloxane having both terminal ends of its molecular chain blocked by dimethylvinylsiloxy groups). The content of alumina powder in the composition was 95.0 wt % (82.4 vol %). The characteristics of the thermally conductive silicone rubber composition and thermally conductive silicone rubber were measured in the same manner as in Practical Example 9 and the results were listed in Table 4.

Practical Example 14

A thermally conductive silicone rubber base was prepared in the same manner as in Practical Example 12 except for using an identical amount of dimethylpolysiloxane having one of the terminal ends of its molecular chain blocked by a trirethoxysiloxy group, represented by the formula:

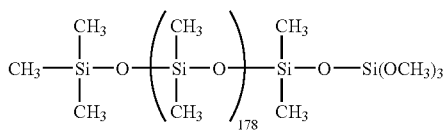

instead of the dimethylpolysiloxane having one of the terminal ends of its molecular chain blocked by a trimethoxysiloxy group that was used in Practical Example 12. The consistency of the silicone rubber base was measured in the same manner as in Practical Example 9 and the results were listed in Table 4.

Next, a thermally conductive silicone rubber composition was prepared by mixing the silicone rubber base with 0.2 parts by weight of a 1,3-divinyl-1,1,3,3-tetramethyldisiloxane complex of platinum with a platinum content of 0.5 wt % (an amount sufficient to provide 10 ppm of platinum metal relative to the above-mentioned dimethylpolysiloxane having both terminal ends of its molecular chain blocked by dimethylvinylsiloxy groups). The characteristics of the thermally conductive silicone rubber composition and thermally conductive silicone rubber were measured in the same manner as in Practical Example 9 and the results were listed in Table 4.

Comparative Example 14

An attempt was made to prepare a thermally conductive silicone rubber base in the same manner as in Practical Example 12 except for using an identical amount of dimethylpolysiloxane having one of the terminal ends of its molecular chain blocked by a trimethoxysiloxy group, represented by the formula:

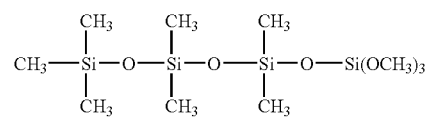

instead of the dimethylpolysiloxane having one of the terminal ends of its molecular chain blocked by a trimethoxysiloxy group that was used in Practical Example 12, but an excessive increase in the viscosity of the base made it impossible to add all of the 1,500 parts by weight of the true spherical alumina powder with an average particle size of 10 μm and the 1,000 parts by weight of the irregular-shaped alumina powder with an average particle size of 2.2 μm.

Comparative Example 15

A thermally conductive silicone rubber base was prepared in the same manner as in Practical Example 12 except for using an identical amount of dimethylpolysiloxane having one of the terminal ends of its molecular chain blocked by a trimethoxysiloxy group, represented by the formula:

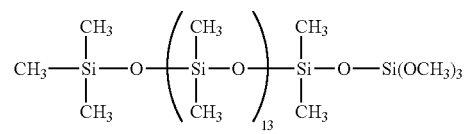

instead of the dimethylpolysiloxane having one of the terminal ends of its molecular chain blocked by a trimethoxysiloxy group that was used in Practical Example 12. The consistency of the silicone rubber base was measured in the same manner as in Practical Example 9 and the results were listed in Table 4.

Next, a thermally conductive silicone rubber composition was prepared by mixing the silicone rubber base with 0.2 parts by weight of a 1,3-divinyl-1,1,3,3-tetramethyldisiloxane complex of platinum with a platinum content of 0.5 wt % (an amount sufficient to provide 10 ppm of platinum metal relative to the above-mentioned dimethylpolysiloxane having both terminal ends of its molecular chain blocked by dimethylvinylsiloxy groups). The characteristics of the thermally conductive silicone rubber composition and thermally conductive silicone rubber were measured in the same manner as in Practical Example 9 and the results were listed in Table 4.

Comparative Example 16

A thermally conductive silicone rubber base was prepared in the same manner as in Practical Example 12 except for using an identical amount of dimethylpolysiloxane having one of the terminal ends of its molecular chain blocked by a tiimethoxysiloxy group, represented by the forula:

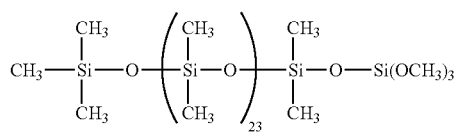

instead of the dimethylpolysiloxane having one of the terminal ends of its molecular chain blocked by a trimethoxysiloxy group that was used in Practical Example 12. The consistency of the silicone rubber base was measured in the same manner as in Practical Example 9 and the results were listed in Table 4.

Next, a thermally conductive silicone rubber composition was prepared by mixing the silicone rubber base with 0.2 parts by weight of a 1,3-divinyl-1,1,3,3-tetramethyldisiloxane complex of platinum with a platinum content of 0.5 wt % (an amount sufficient to provide 10 ppm of platinum metal relative to the above-mentioned dimethylpolysiloxane having both terminal ends of its molecular chain blocked by dimethylvinylsiloxy groups). The characteristics of the thermally conductive silicone rubber composition and thermally conductive silicone rubber were measured in the same manner as in Practical Example 9 and the results were listed in Table 4.

Comparative Example 17

A thermally conductive silicone rubber base was prepared in the same manner as in Practical Example 12 except for using an identical amount of dimethylpolysiloxane having one of the terminal ends of its molecular chain blocked by a trimethoxysiloxy group, represented by the formula:

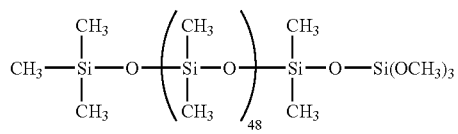

instead of the dimethylpolysiloxane having one of the terminal ends of its molecular chain blocked by a trimethoxysiloxy group that was used in Practical Example 12. The consistency of the silicone rubber base was measured in the same manner as in Practical Example 9 and the results were listed in Table 4.

Next, a thermally conductive silicone rubber composition was prepared by mixing the silicone rubber base with 0.2 parts by weight of a 1,3-divinyl-1,1,3,3-tetramethyldisiloxane complex of platinum with a platinum content of 0.5 wt % (an amount sufficient to provide 10 ppm of platinum metal relative to the above-mentioned dimethylpolysiloxane having both terminal ends of its molecular chain blocked by dimethylvinylsiloxy groups). The characteristics of the thermally conductive silicone rubber composition and thermally conductive silicone rubber were measured in the same manner as in Practical Example 9 and the results were listed in Table 4.

Comparative Example 18

An attempt was made to prepare a thermally conductive silicone rubber base in the same manner as in Practical Example 12 except for using an identical amount of dimethylpolysiloxane having both terminal ends of its molecular chain blocked by trimethoxysiloxy groups, represented by the formula:

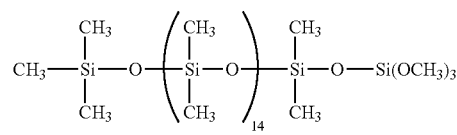

instead of the dimethylpolysiloxane having one of the terminal ends of its molecular chain blocked by a trimethoxysiloxy group that was used in Practical Example 12, but an excessive increase in the viscosity of the base made it impossible to add all of the 1,500 parts by weight of the true spherical alumina powder with an average particle size of 10 µm and the 1,000 parts by weight of the irregular-shaped alumina powder with an average particle size of 2.2 µm.

Comparative Example 19

An attempt was made to prepare a thermally conductive silicone rubber base in the same manner as in Practical Example 12 except for using an identical amount of dimethylpolysiloxane having both terminal ends of its molecular chain blocked by trimethoxysiloxy groups, represented by the formula:

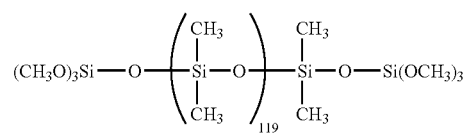

instead of the dimethylpolysiloxane having one of the terminal ends of its molecular chain blocked by a trimethoxysiloxy group that was used in Practical Example 12, but an excessive increase in the viscosity of the base made it impossible to add all of the 1,500 parts by weight of the true spherical alumina powder with an average particle size of 10 µm and the 1,000 parts by weight of the irregular-shaped alumina powder with an average particle size of 2.2 µm.

TABLE 4

| | Examples | | | | | |
| | Practical Examples | | | Comparative Examples | | |
| Parameters | 12 | 13 | 14 | 15 | 16 | 17 |
|---|---|---|---|---|---|---|
| Consistency (mm/10) | 70 | 67 | 60 | 11 | 22 | 44 |
| Moldability | ○ | ○ | ○ | Δ | Δ | ○ |
| Thermal Conductivity (W/m · k) | 5.4 | 5.5 | 5.5 | 5.7 | 5.7 | 5.5 |
| Hardness | 40 | 43 | 46 | 88 | 74 | 60 |

The thermally conductive silicone rubber compositions listed in Table 4 had extremely high alumina powder loading levels of 82.4 vol %. Comparison between Practical Examples 12 through 14 and Comparative Examples 15 through 17 showed that depending on the number of dimethylsiloxane repeat units in the dimethylpolysiloxanes having one of the terminal ends of their molecular chains blocked by trimethoxysiloxy groups, there was considerable variation in the consistency of the thermally conductive silicone rubber compositions, and, in addition, considerable variation in the hardness of the silicone rubbers obtained by curing them. Additionally, comparison between Practical Example 12 and Comparative Example 19 showed that even if the number of dimethylsiloxane repeat units in the dimethylpolysiloxanes was the same, the consistency of the thermally conductive silicone rubber composition greatly varied, and, in addition, there was considerable variation in the hardness of the silicone rubber produced by curing the compositions depending on whether the molecular chain was blocked with a trimethoxysiloxy group at one terminal end or with trimethoxysiloxy groups at both terminal ends. Furthermore, comparison between Comparative Example 18 and Comparative Example 19 showed that, at equal number of dimethylsiloxane repeat units in the dimethylpolysiloxanes, the consistency of the thermally conductive silicone rubber composition increased and its handleability decreased regardless of the number of dimethylsiloxane repeat units when both terminal ends of the molecular chain of the dimethylpolysiloxane were blocked by trimethoxysiloxy groups Practical Example 15

Dimethylpolysiloxane (86.8 parts by weight) with a viscosity of 400 mPa·s having both terminal ends of its molecular chain blocked by dimethylvinylsiloxy groups (vinyl group content=0.44 wt %), 900 parts by weight of spherical alumina powder with an average particle size of 10 µm, and 10 parts by weight of organosiloxane represented by the formula:

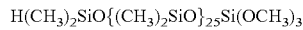

were combined in a mixer. Next, 2.2 parts by weight of dimethylsiloxane-methylhydrogensiloxane copolymer having both terminal ends of its molecular chain blocked by trimethylsiloxy groups, a viscosity of 5 mPa·s and an average of five silicon-bonded hydrogen atoms per molecule (content of silicon-bonded hydrogen atoms=0.74 wt %) and 0.5 parts by weight of 1-ethynyl-1-cyclohexanol as a cure reaction inhibitor were combined with the mixture. Finally, a thermally conductive silicone rubber composition was prepared by combining the mixture with 0.5 parts by weight of a 1,3-divinyl-1,1,3,3-tetramethyldisiloxane complex of platinum with a platinum content of 0.5 wt %.

The characteristics of the thermally conductive silicone rubber composition and thermally conductive silicone rubber were determined as follows, with the results listed in Table 5.

Consistency Of Thermally Conductive Silicone Rubber Composition

The ¼ cone penetration consistency of the thermally conductive silicone rubber composition was measured in accordance with the method stipulated in JIS K 2220. A high consistency value was interpreted as evidence of the high plasticity and superior handleability of the thermally conductive silicone rubber composition.

Moldability Of Thermally Conductive Silicone Rubber Composition

A layer of the thermally conductive silicone rubber composition with a thickness of 2 mm was produced by sandwiching it between pieces of ethylene tetrafluoride resin film with a thickness of 0.2 mm, after which it was cured by heating at 150° C. for 15 minutes. After that, the ethylene tetrafluoride resin film was peeled off and visual examination was carried out to determine whether a silicone rubber sheet had been formed. When a uniform silicone rubber sheet was formed, the moldability of the composition was evaluated as "excellent" and designated "○"; when a sheet was formed, but had locations of partially low strength, the moldability was evaluated as "somewhat good" and designated as "Δ"; and when a sheet could not be formed, or had low strength when formed, the moldability was evaluated as "no good" and designated as "x".

Thermal Conductivity Of Thermally Conductive Silicone Rubber

The thermal conductivity of the thermally conductiye silicone rubber obtained by heating the thermally conductive silicone rubber composition at 150° C. for 15 minutes was determined in accordance with the hot wire method stipulated in JIS R 2616 using a Ouick Thermal Conductivity Meter, the QTM-500, manufactured by Kyoto Electronics Manufacturing Co., Ltd.

Adhesive Strength Of Thermally Conductive Silicone Rubber

The thermally conductive silicone rubber composition was sandwiched between two pieces of identical material and then cured by heating at 150° C. for 30 minutes. Aluminum plates (JIS H 4000, A1050P), nickel plates (SPCC-SB, and stainless steel plates (SUS-304 2B from Paltek Co., Ltd. were used as the adherend, material. In addition, the surface area of the plates, to which the composition was adhered, was 25 mm×10 mm, and the thickness of the adhered layer was 1 mm. The tensile shear adhesive strength of the thermally conductive silicone rubber was measured in accordance with JIS K 6249.

TABLE 5

| Parameters | Example Practical Example 15 |
|---|---|
| Consistency (mm/10) | 109 |
| Moldability | ◯ |
| Thermal conductivity (W/mK) | 3.0 |
| Adhesive strength (N/cm²) | |
| Aluminum plates | 193 |
| Nickel plates | 207 |
| Stainless steel plates | 161 |

Practical Example 16

A thermally conductive silicone grease was prepared by mixing 75 parts by weight of dimethylpolysiloxane with a viscosity of 300 mPa·s having both terminal ends of its molecular chain blocked by timethylsiloxy groups, 137 parts by weight of spherical alumina powder with an average particle size of 0.4 μm, 167 parts by weight of spherical alumina powder with an average particle size of 2 μm, 616 parts by weight of spherical alumina powder with an average particle size of 18 μm, and 5 parts by weight of dimethylpolysiloxane having one of the terminal ends of its molecular chain blocked by a trimethoxysiloxy group, represented by the formula:

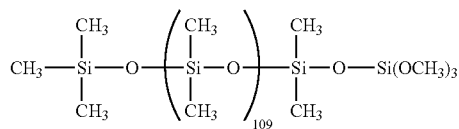

in a mixer at room temperature.

Some of the thermally conductive silicone grease was placed in a 50-ml glass beaker and the ¼ cone penetration consistency of the silicone grease was measured in accordance with the method stipulated in JIS K 2220, with the results listed in Table 6. A high consistency value was interpreted as evidence of the high plasticity and superior handleability of the thermally conductive silicone grease. In addition, the thermally conductive silicone grease was wrapped in vinylidene chloride film and its thermal conductivity was determined in accordance with the hot wire method stipulated in JIS R 2616 using a Quick Thermal Conductivity Meter, the QTM-500, manufactured by Kyoto Electronics Manufacturing Co., Ltd., with the results listed in Table 6.

Practical Example 17

A thermally conductive silicone grease was prepared in the same manner as in Practical Example 16 except for using an identical amount of organosiloxane represented by the formula:

$(CH_2=CH)(CH_3)_2SiO\{(CH_3)_2SiO\}_{29}Si(OCH_3)_3$ instead of the dimethylpolysiloxane having one of the terminal ends of its molecular chain blocked by a trimethoxysiloxy group that was used in Practical Example 16. The consistency and thermal conductivity of the thermally conductive silicone grease were determined in the same manner as in Practical Example 16 and the results were listed in Table 6.

Practical Example 18

A thermally conductive silicone grease was prepared in the same manner as in Practical Example 16 except for using an identical amount of oligosiloxane represented by the formula:

$H(CH_3)_2SiO\{(CH_3)_2SiO\}_{25}Si(OCH_3)_3$ instead of the dimethylpolysiloxane having one of the terminal ends of its molecular chain blocked by a trimethoxysiloxy group that was used in Practical Example 16. The consistency and thermal conductivity of the thermally conductive silicone grease were determined in the same manner as in Practical Example 16 and the results were listed in Table 6.

Practical Example 19

A thermally conductive silicone grease was prepared in the same manner as in Practical Example 16 except for using an identical amount of oligosiloxane represented by the formula:

$(CH_3)_3SiO\{(CH_2=CH)CH_3SiO\}_3\{(CH_3)_2SiO\}_{22}Si(OCH_3)_3$ instead of the dimethylpolysiloxane having one of the terminal ends of its molecular chain blocked by a trimethoxysiloxy group that was used in Practical Example 16. The consistency and thermal conductivity of the thermally conductive silicone grease were determined in the same manner as in Practical Example 16 and the results were listed in Table 6.

Practical Example 20

A thermally conductive silicone grease was prepared in the same manner as in Practical Example 16 except for using an identical amount of dimethylpolysiloxane with a viscosity of 400 mPa·s having both terminal ends of its molecular chain blocked by dimethylvinylsiloxy groups (vinyl group content=0.44 wt %) instead of the dimethylpolysiloxane with a viscosity of 300 mPa·s having both terminal ends of its molecular chain blocked by trimethylsiloxy groups that was used in Practical Example 16. The consistency and thermal conductivity of the thermally conductive silicone grease were determined in the same manner as in Practical Example 16 and the results were listed in Table 6.

Practical Example 21

A thermally conductive silicone grease was prepared in the same manner as in Practical Example 16 except for using an identical amount of organosiloxane copolymer with a viscosity of 500 mPa·s consisting of 2.22 mol % of siloxane units represented by the formula $(CH_3)_3SiO_{1/2}$, 0.9 mol % of siloxane units represented by the formula $(CH_3)_2(CH_2=CH)SiO_{1/2}$, 3.28 mol % of siloxane units represented by the formula $CH_3SiO_{3/2}$, and 93.6 mol % of siloxane units represented by the formula $(CH_3)_2 SiO_{2/2}$ instead of the dimethylpolysiloxane with a viscosity of 300 mPa·s having both terminal ends of its molecular chain blocked by trimethylsiloxy groups that was used in Practical Example 16. The consistency and thermal conductivity of the thermally conductive silicone grease were determined in the same manner as in Practical Example 16 and the results were listed in Table 6.

Comparative Example 20

An attempt was made to prepare a thermally conductive silicone grease in the same manner as in Practical Example 16 except for using an identical amount of methyltrimethoxysilane instead of the dimethylpolysiloxane having one of the terminal ends of its molecular chain blocked by a trimethoxylsiloxy group that was used in Practical Example 16, but an excessive increase in the viscosity of the composition made it impossible to add the specified amount of alumina powder and to determine the consistency and measure the thermal conductivity of the thermally conductive silicone grease.

Comparative Example 21

An attempt was made to prepare a thermally conductive silicone grease in the same manner as in Practical Example 16 except for using an identical amount of oligosiloxane represented by the formula:

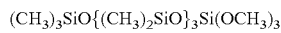

instead of the dimethylpolysiloxane having one of the terminal ends of its molecular chain blocked by a trimethoxylsiloxy group that was used in Practical Example 16, but an excessive increase in the viscosity of the composition made it impossible to add the specified amount of alumina powder and to determine the consistency and thermal conductivity of the thermally conductive silicone grease.

Comparative Example 22

A thermally conductive silicone grease was prepared in the same manner as in Practical Example 16 except for using an identical amount of decyltrimethoxysilane instead of the dimethylpolysiloxane having one of the terminal ends of its molecular chain blocked by a trmethoxylsiloxy group that was used in Practical Example 16. The consistency and thermal conductivity of the thermally conductive silicone grease were determined in the same manner as in Practical Example 16 and the results were listed in Table 6.

Comparative Example 23

A thermally conductive silicone grease was prepared in the same manner as in Practical Example 21 except for using an identical amount of decyltrimethoxysilane instead of the dimethylpolysiloxane having one of the terminal ends of its molecular chain blocked by a trmethoxylsiloxy group that was used in Practical Example 21. The consistency and thermal conductivity of the silicone grease were determined in the same manner as in Practical Example 16 and the results were listed in Table 6.

TABLE 6

| | Examples | | | | | | | |
|---|---|---|---|---|---|---|---|---|
| | Practical Examples | | | | | | Comparative Examples | |
| Parameters | 16 | 17 | 18 | 19 | 20 | 21 | 22 | 23 |
| Consistency (mm/10) | 120 | 83 | 82 | 92 | 115 | 90 | 66 | 67 |
| Thermal conductivity (W/m · k) | 4.5 | 4.5 | 4.5 | 4.5 | 4.5 | 4.5 | 4.5 | 4.5 |

Practical Example 22

A thermally conductive silicone grease was prepared by mixing 74.5 parts by weight of dimethylpolysiloxane with a viscosity of 300 mPa·s having both terminal ends of its molecular chain blocked by trimethylsiloxy groups, 137 parts by weight of spherical alumina powder with an average particle size of 0.4 pn, 167.6 parts by weight of spherical alumina powder with an average particle size of 2 μm, 615.4 parts by weight of spherical alumina powder with an average particle size of 18 μm, and 5.0 parts by weight of organopolysiloxane represented by the formula:

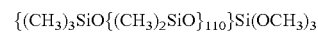

and 0.5 parts by weight of methyltrimethoxysilane under heating and reduced pressure in a Ross mixer for 1 hour at 150° C., cooling the mixture to room temperature, and continuing agitation for another hour. The initial consistency of the thermally conductive silicone grease and its consistency after conducting heat treatment for 24 hours at 105° C. were determined in the same manner as in Practical Example 16 and the results were listed in Table 7. In addition, the thermal conductivity of the thermally conductive silicone grease was determined in the same manner as in Practical Example 16 and the results were listed in Table 7.

Practical Example 23

A thermally conductive silicone grease was prepared by mixing 72.05 parts by weight of dimethylpolysiloxane with a viscosity of 300 mPa·s having both terminal ends of its molecular chain blocked by trimethylsiloxy groups, 137 parts by weight of spherical alumina powder with an average particle size of 0.4 μm, 167.6 parts by weight of spherical alumina powder with an average particle size of 2 μm, 615.4 parts by weight of spherical alumina powder with an average particle size of 18 μm, 7.5 parts by weight of organopolysiloxane represented by the formula:

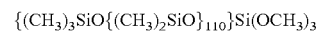

and 0.45 parts by weight of methyltrimethoxysilane under heating and reduced pressure in a Ross mixer for 1 hour at 150° C., cooling the mixture to room temperature, and continuing agitation for another hour. The consistency and thermal conductivity of the thermally conductive silicone grease were determined in the same manner as in Practical Example 16 and the results were listed in Table 7.

Practical Example 24

A thermally conductive silicone grease was prepared by mixing 75 parts by weight of dimethylpolysiloxane with a viscosity of 300 mPa·s having both terminal ends of its molecular chain blocked by trimethylsiloxy groups, 137 parts by weight of spherical alumina powder with an average particle size of 0.4 µm, 167.6 parts by weight of spherical alumina powder with an average particle size of 2 µm, 615.4 parts by weight of spherical alumina powder with an average particle size of 18 µm, and 5.0 parts by weight of organopolysiloxane represented by the formula:

$\{(CH_3)_3SiO\{(CH_3)_2SiO\}_{110}\}Si(OCH_3)_3$ under heating and reduced pressure in a Ross mixer for 1 hour at 150° C., cooling the mixture to room temperature, and continuing agitation for another hour. The consistency and thermal conductivity of the thermally conductive silicone grease were determined in the same manner as in Practical Example 16 and the results were listed in Table 7.

TABLE 7

| | | Examples Practical Examples | | |
|---|---|---|---|---|
| Parameters | | 22 | 23 | 24 |
| Consistency (mm/10) | Initial | 112 | 97 | 96 |
| | After 24 hours at 105° C. | 96 | 97 | 65 |
| Thermal conductivity (W/m · k) | | 4.3 | 4.3 | 4.1 |

Practical Example 25

Dimethylpolysiloxane (43.6 parts by weight) with a viscosity of 400 mPa·s having both terminal ends of its molecular chain blocked by dimethylvinylsiloxy groups (vinyl group content=0.44 wt %), 552 parts by weight of spherical alumina powder with an average particle size of 40 µm, 368 parts by weight of irregular-shaped alumina powder with an average particle size of 2.2 µm, 15 parts by weight of organosiloxane represented by the formula:

$\{(CH_2=CH)(CH_3)_2SiO\{(CH_3)_2SiO\}_{29}\}Si(OCH_3)_3$ and 15 parts by weight of organosiloxane represented by the formula:

$(CH_3)_3SiO\{(CH_3)_2SiO\}_{110}Si(OCH_3)_3$ were combined in a mixer. Next, 3.4 parts by weight of dimethylsiloxane-methylhydrogensiloxane copolymer having both terminal ends of its molecular chain blocked by trimethylsiloxy groups, a viscosity of 5 mPa·s, and an average of five silicon-bonded hydrogen atoms per molecule (content of silicon-bonded hydrogen atoms=0.74 wt %), 0.5 parts by weight of 1-ethynyl-1-cyclohexanol as a cure reaction inhibitor, and 1.0 part by weight of 3-glycidoxypropyltrimethoxysilane and 1.0 part by weight of dimethylsiloxane-methylvinylsiloxane copolymer having both terminal ends of its molecular chain blocked by hydroxydimethyl groups and an average of two silicon-bonded vinyl groups per molecule (vinyl group content=9.6 wt %) as an adhesion promoter were combined with the mixture. Finally, a thermally conductive silicone rubber composition was prepared by combining the mixture with 0.5 parts by weight of a 1,3-divinyl-1,1,3,3-tetramethyldisiloxane complex of platinum with a platinum content of 0.5 wt %. The characteristics of the thermally conductive silicone rubber composition and thermally conductive silicone rubber were determined in the same manner as in Practical Example 1 and the results were listed in Table 8.

Practical Example 26

Dimethylpolysiloxane (42.9 parts by weight) with a viscosity of 400 mPa·s having both terminal ends of its molecular chain blocked by dimethylvinylsiloxy groups (vinyl group content=0.44 wt %), 552 parts by weight of spherical alumina powder with an average particle size of 40 µm, 368 parts by weight of irregular-shaped alumina powder with an average particle size of 2.2 µm, 24 parts by weight of organosiloxane represented by the formula:

$\{(CH_2=CH)(CH_3)_2SiO\{(CH_3)_2SiO\}_{29}\}Si(OCH_3)_3$ and 6 parts by weight of organosiloxane represented by the formula:

$(CH_3)_3SiO\{(CH_3)_2SiO\}_{110}Si(OCH_3)_3$ were combined in a mixer. Next, 4.1 parts by weight of dimethylsiloxane-methylhydrogensiloxane copolymer having both terminal ends of its molecular chain blocked by trimethylsiloxy groups, a viscosity of 5 mPa·s, and an average of five silicon-bonded hydrogen atoms per molecule (content of silicon-bonded hydrogen atoms=0.74 wt %), 0.5 parts by weight of 1-ethynyl-1-cyclohexanol as a cure reaction inhibitor, and 1.0 part by weight of 3-glycidoxypropyltrimethoxysilane and 1.0 part by weight of dimethylsiloxane-methylvinylsiloxane copolymer having both terminal ends of its molecular chain blocked by hydroxydimethyl groups and an average of two silicon-bonded vinyl groups per molecule (vinyl group content=9.6 wt %) as an adhesion promoter were combined with the mixture. Finally, a thermally conductive silicone rubber composition was prepared by combining the mixture with 0.5 parts by weight of a 1,3-divinyl-1,1,3,3-tetramethyldisiloxane complex of platinum with a platinum content of 0.5 wt %. The characteristics of the thermally conductive silicone rubber composition and thermally conductive silicone rubber were determined in the same manner as in Practical Example 1 and the results were listed in Table 8.

Practical Example 27

Dimethylpolysiloxane (44.0 parts by weight) with a viscosity of 400 mPa·s having both terminal ends of its molecular chain blocked by dimethylvinylsiloxy groups (vinyl group content=0.44 wt %), 552 parts by weight of spherical alumina powder with an average particle size of 40 µm, 368 parts by weight of irregular-shaped alumina powder with an average particle size of 2.2 µm, 10 parts by weight of organosiloxane represented by the formula:

$\{(CH_2=CH)(CH_3)_2SiO\{(CH_3)_2SiO\}_{29}\}Si(OCH_3)_3$ and 20 parts by weight of organosiloxane represented by the formula:

$(CH_3)_3SiO\{(CH_3)_2SiO\}_{110}Si(OCH_3)_3$ were combined in a mixer. Next, 3.0 parts by weight of dimethylsilsiloxane-methylhydrogensiloxane copolymer having both terminal ends of its molecular chain blocked by trimethylsiloxy groups, a viscosity of 5 mPa·s, and an average of five silicon-bonded hydrogen atoms per molecule (content of silicon-bonded hydrogen atoms=0.74 wt %), 0.5 parts by weight of 1-ethynyl-1-cyclohexanol as a cure reaction inhibitor, and 1.0 part by weight of 3-glycidoxypropyltrimethoxysilane and 1.0 part by weight of dimethylsiloxane-methylvinylsiloxane copolymer having both terminal ends of its molecular chain blocked by hydroxydimethyl groups and an average of two silicon-bonded vinyl groups per molecule (vinyl group content=9.6 wt %) as an adhesion promoter were combined with the mixture. Finally, a thermally conductive silicone rubber composition was prepared by combining the mixture with 0.5 parts by weight of a 1,3-divinyl-1,1,3,3-tetramethyldisiloxane complex of platinum with a platinum content of 0.5 wt %. The characteristics of the thermally conductive silicone rubber composition and thermally conductive silicone rubber were determined in the same manner as in Practical Example 1 and the results were listed in Table 8.

Practical Example 28

Dimethylpolysiloxane (43.2 parts by weight) with a viscosity of 400 mPa·s having both terminal ends of its molecular chain blocked by dimethylvinylsiloxy groups (vinyl group content=0.44 wt %), 552 parts by weight of spherical alumina powder with an average particle size of 40 μm, 368 parts by weight of irregular-shaped alumina powder with an average particle size of 2.2 μm, 20 parts by weight of organosiloxane represented by the formula:

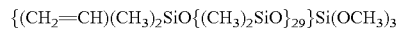

$\{(CH_2=CH)(CH_3)_2SiO\{(CH_3)_2SiO\}_{29}\}Si(OCH_3)_3$ and 10 parts by weight of organosiloxane represented by the formula:

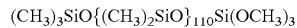

$(CH_3)_3SiO\{(CH_3)_2SiO\}_{110}Si(OCH_3)_3$ were combined in a mixer. Next, 3.8 parts by weight of dimethylsiloxane-methylhydrogensiloxane copolymer having both terminal ends of its molecular chain blocked by trimethylsiloxy groups, a viscosity of 5 mPa·s, and an average of five silicon-bonded hydrogen atoms per molecule (content of silicon-bonded hydrogen atoms=0.74 wt %), 0.5 parts by weight of 1-ethynyl-1-cyclohexanol as a cure reaction inhibitor, and 1.0 part by weight of 3-glycidoxypropyltrimethoxysilane and 1.0 part by weight of dimethylsiloxane-methylvinylsiloxane copolymer having both terminal ends of its molecular chain blocked by hydroxydimethyl groups and an average of two silicon-bonded vinyl groups per molecule (vinyl group content=9.6 wt %) as an adhesion promoter were combined with the mixture. Finally, a thermally conductive silicone rubber composition was prepared by combining the mixture with 0.5 parts by weight of a 1,3-divinyl-1,1,3,3-tetramethyldisiloxane complex of platinum with a platinum content of 0.5 wt %. The characteristics of the thermally conductive silicone rubber composition and thermally conductive silicone rubber were determined in the same manner as in Practical Example 1 and the results were listed in Table 8.

Comparative Example 24

Dimethylpolysiloxane (85.4 parts by weight) with a viscosity of 400 mPa·s having both terminal ends of its molecular chain blocked by dimethylvinylsiloxy groups (vinyl group content=0.44 wt %), 900 parts by weight of spherical alumina powder with an average particle size of 10 μm, and 10 parts by weight of methyltrimethoxysilane were combined in a mixer. Next, 3.6 parts by weight of dimethylsiloxanemethylhydrogen-siloxane copolymer having both terminal ends of its molecular chain blocked by trimethylsiloxy groups, a viscosity of 5 mPa·s, and an average of five silicon-bonded hydrogen atoms per molecule (content of silicon-bonded hydrogen atoms=0.74 wt %), 0.5 parts by weight of 1-ethynyl-1-cyclohexanol as a cure reaction inhibitor, and 1.0 part by weight of 3-glycidoxypropyltrimethoxysilane and 1.0 part by weight of dimethylsiloxane-methylvinylsiloxane copolymer having both terminal ends of its molecular chain blocked by hydroxydimethyl groups and an average of two silicon-bonded vinyl groups per molecule (vinyl group content=9.6 wt %) as an adhesion promoter were combined with the miuture. Finally, a thermally conductive silicone rubber composition was prepared by combining the mixture with 0.5 parts by weight of a 1,3-divinyl-1,1,3,3-tetramethyldisiloxane complex of platinum with a platinum content of 0.5 wt %. The characteristics of the thermally conductive silicone rubber composition and thermally conductive silicone rubber were determined in the same manner as in Practical Example 1 and the results were listed in Table 8.

Comparative Example 25

A thermally conductive silicone rubber composition was prepared in the same manner as in Comparative Example 24 except for using an identical amount of decyltrimethoxysilane instead of methyltrimethoxysilane. The characteristics of the thermally conductive silicone rubber composition and thermally conductive silicone rubber were determined in the same manner as in Practical Example 1 and the results were listed in Table 8.

Comparative Example 26

A thermally conductive silicone rubber composition was prepared in the same manner as in Comparative Example 24 except for using an identical amount of organosiloxane represented by the formula:

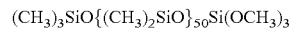

$(CH_3)_3SiO\{(CH_3)_2SiO\}_{50}Si(OCH_3)_3$ instead of methyltrimethoxysilane. The characteristics of the thermally conductive silicone rubber composition and thermally conductive silicone rubber were determined in the same manner as in Practical Example 1 and the results were listed in Table 8.

TABLE 8

| | Examples | | | | | | |
| --- | --- | --- | --- | --- | --- | --- | --- |
| | Practical Examples | | | | Comparative Examples | | |
| Parameters | 25 | 26 | 27 | 28 | 24 | 25 | 26 |
| Consistency (mm/10) | 148 | 121 | 144 | 136 | 30 | 103 | 123 |
| Moldability | ○ | ○ | ○ | ○ | X | X | X |
| Thermal conductivity (W/m · k) | 4.3 | 4.3 | 4.3 | 4.3 | 3.0 | 3.0 | 3.0 |
| Adhesive strength (N/cm$^2$) | 257 | 296 | 203 | 299 | 212 | 54 | 13 |

Practical Example 29

A thermally conductive silicone grease was prepared by mixing 70 parts by weight of dimethylpolysiloxane with a viscosity of 300 mPa·s having both terminal ends of its molecular chain blocked by trimethylsiloxy groups, 552 parts by weight of spherical alumina powder with an average particle size of 40 μm, 368 parts by weight of irregular-shaped alumina powder with an average particle size of 2.2 μm, 5.0 parts by weight of organosiloxane represented by the formula:

{(CH$_2$=CH)(CH$_3$)$_2$SiO{(CH$_3$)$_2$SiO}$_{29}$}Si(OCH$_3$)$_3$ and 5.0 parts by weight of organosiloxane represented by the formula:

(CH$_3$)$_3$SiO{(CH$_3$)$_2$SiO}$_{110}$Si(OCH$_3$)$_3$ at room temperature.

Some of the thermally conductive silicone grease was placed in a 50-ml glass beaker and the ¼ cone penetration consistency of the silicone grease was measured in accordance with the method stipulated in JIS K 2220, with the results listed in Table 9. Also, a high consistency value was interpreted as evidence of the high plasticity and superior handleability of the thermally conductive silicone grease. In addition, the thermally conductive silicone grease was wrapped in vinylidene chloride film and its thermal conductivity was determined in accordance with the hot wire method stipulated in JIS R 2616 using a Quick Thermal Conductivity Meter, the QTM-500, manufactured by Kyoto Electronics Manufacturing Co., Ltd., with the results listed in Table 9.

Practical Example 30

A thermally conductive silicone grease was prepared by mixing 70 parts by weight of dimethylpolysiloxane with a viscosity of 300 mPa·s having both terminal ends of its molecular chain blocked by trimethylsiloxy groups, 552 parts by weight of spherical alumina powder with an average particle size of 40 μm, 368 parts by weight of irregular-shaped alumina powder with an average particle size of 2.2 μm, and 10 parts by weight of organosiloxane represented by the formula:

(CH$_3$)$_3$SiO{(CH$_3$)$_2$SiO}$_{110}$Si(OCH$_3$)$_3$ at room temperature. The characteristics of the thermally conductive silicone grease were determined in the same manner as in Practical Example 29 and the results were listed in Table 9.

TABLE 9

| Parameters | Examples Practical Examples | |
|---|---|---|
| | 29 | 30 |
| Consistency (mm/10) | 112 | 89 |
| Thermal conductivity (W/m · k) | 4.3 | 4.3 |

INDUSTRIAL APPLICABILITY

The thermally conductive silicone composition of the present invention is characterized by exhibiting excellent handleability despite containing large quanitities of thermally conductive fillers added in order to produce a silicone composition exhibiting high thermal conductivity.

What is claimed is:
1. A thermally conductive silicone composition comprising:
   (A) an organopolysiloxane,
   (B) a thermally conductive filler comprising a metal powder, a metal oxide powder, a metal nitride powder, a metal carbide powder, a soft magnetic alloy powder, a ferrite, and combinations thereof, and
   (C) at least one organosiloxane selected from the group consisting of
      (i) an organosiloxane represented by the general formula:

[R$^1_a$R$^2_{(3-a)}$SiO(R$^1_b$R$^2_{(2-b)}$SiO)$_m$(R$^2_2$SiO)$_n$]$_c$SiR$^2_{[4-(c+d)]}$(OR$^3$)$_d$ where R$^1$ stand for monovalent hydrocarbon groups having aliphatic unsaturated bonds, R$^2$ stand for identical or different monovalent hydrocarbon groups having no aliphatic unsaturated bonds, R$^3$ is selected from a group consisting of an alkyl, alkoxyalkyl, alkenyl, and acyl, the subscript a is an integer of 0 to 3, b is 1 or 2, c is an integer of 1 to 3, d is an integer of 1 to 3, c+d is an integer of 2 to 4, m is an integer of 0 or greater, and n is integer of from 10 to 100, with the proviso that m is an integer of 1 or greater when a is 0,
      (iii) an organosiloxane represented by the general formula:

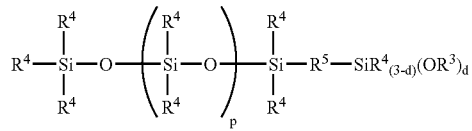

where R$^4$ is identical or different monovalent hydrocarbon groups, R$^5$ is an oxygen atom or divalent hydrocarbon group, R$^3$ is the same as defined above, p is an integer of 105 to 200, and d is the same as above, and
      (iv) an organosiloxane represented by the general formula:

[H$_e$R$^2_{(3-e)}$SiO(R$^2_2$SiO)$_n$]$_c$SiR$^2_{[4-(c+d)]}$(OR$^3$)$_d$ where R$^2$, R$^3$, c,d and n are the same as defined above, and e is an integer of 1 to 3.

2. The thermally conductive silicone composition according to claim 1, in which the average particle size of Component (B) is 0.1 to 100 μm.

3. The thermally conductive silicone composition according to claim 1, in which Component (B) is an alumina powder.

4. The thermally conductive silicone composition according to claim 3, in which Component (B) is a mixture of (B$_1$) a spherical alumina powder with an average particle size of greater than 5 to 50 μm and (B$_2$) a spherical or inegular-shaped alumina powder with an average particle size of 0.1 to 5 μm.

5. The thermally conductive silicone composition according to claim 4, in which Component (B) is made up of 30 to 90 wt % of component (B$_1$) and 10 to 70 wt % of component (B$_2$).

6. The thermally conductive silicone composition according to claim 1, in which the content of Component (B) is 500 to 2,500 parts by weight per 100 parts by weight of Component (A).

7. The thermally conductive silicone composition according to claim 1, in which the content of Component (C) is 0.1 to 10 parts by weight per 100 parts by weight of Component (B).

8. The thermally conductive silicone composition according to claim 1, in which Component (B) is surface-treated with Component (C) in Component (A).

9. The thermally conductive silicone composition according to claim 1, in which the thermally conductive silicone composition further contains (D) a curing agent and is curable.

10. The thermally conductive silicone composition according to claim 9, in which the thermally conductive silicone composition is curable by means selected from the group consisting of (i) a hydrosilation reaction, (ii) condensation reaction, and (iii) an organic peroxide-induced free radical reaction.

11. The thermally conductive silicone composition according to claim 9, in which the thermally conductive silicone composition is curable by means of a hydrosilation reaction.

12. The thermally conductive silicone composition according to claim 1, in which Component (A) has a viscosity of from 100 to 50,000 MPa·s at 25°0 C.

13. The thermally conductive silicone composition according to claim 12, in which Component (A) comprises at least one of an alkyl group, an alkenyl group, and an aryl group.

14. The thermally conductive silicone composition according to claim 13, in which the alkyl group comprises a methyl group, the alkenyl group comprises a vinyl group and the aryl group comprises a phenyl group.

15. The thermally conductive silicone composition according to claim 14, in which Component (A) has an average of at least 0.8 silicon-bonded alkyenyl groups per molecule.

16. The thermally conductive silicone composition according to claim 1, in which Component (A) has an average of at least 0.1 silicon-bonded alkyenyl groups per molecule.

17. The thermally conductive silicone composition according to claim 16, in which Component (A) has an average of at least 0.8 silicon-bonded alkyenyl groups per molecule.

18. The thermally conductive silicone composition according to claim 1, in which p is an integer of 110 to 190.

* * * * *

UNITED STATES PATENT AND TRADEMARK OFFICE
CERTIFICATE OF CORRECTION

| | | |
|---|---|---|
| PATENT NO. | : 7,329,706 B2 | Page 1 of 1 |
| APPLICATION NO. | : 10/476998 | |
| DATED | : February 12, 2008 | |
| INVENTOR(S) | : Hiroshi Fukui et al. | |

It is certified that error appears in the above-identified patent and that said Letters Patent is hereby corrected as shown below:

Column 52, line 57, after "spherical or," delete "inegular" insert therein -- irregular --.

Column 53, line 24, delete "0" located between "25 °" and "C".

Signed and Sealed this

Twenty-sixth Day of August, 2008

JON W. DUDAS
*Director of the United States Patent and Trademark Office*